United States Patent
Hagi et al.

(10) Patent No.: US 12,215,219 B2
(45) Date of Patent: Feb. 4, 2025

(54) RESIN COMPOSITION, MOLDED ARTICLE, AND AUTOMATIC TRANSMISSION

(71) Applicant: DAIKIN INDUSTRIES, LTD., Osaka (JP)

(72) Inventors: Keisuke Hagi, Osaka (JP); Tomihiko Yanagiguchi, Osaka (JP); Yuma Osafune, Osaka (JP); Ryo Inoue, Osaka (JP); Takuma Maruhashi, Osaka (JP); Kazuya Kawahara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 539 days.

(21) Appl. No.: 17/582,749

(22) Filed: Jan. 24, 2022

(65) Prior Publication Data

US 2022/0186016 A1   Jun. 16, 2022

Related U.S. Application Data

(63) Continuation of application No. PCT/JP2020/028238, filed on Jul. 21, 2020.

(30) Foreign Application Priority Data

Jul. 25, 2019  (JP) ................. 2019-137107

(51) Int. Cl.
| | | |
|---|---|---|
| C08L 27/18 | (2006.01) | |
| C08K 3/04 | (2006.01) | |
| C08K 3/34 | (2006.01) | |
| C08K 7/06 | (2006.01) | |
| C08K 7/14 | (2006.01) | |
| C09K 3/10 | (2006.01) | |
| F16J 9/28 | (2006.01) | |
| F16J 15/20 | (2006.01) | |
| F16J 15/3284 | (2016.01) | |

(52) U.S. Cl.
CPC .............. *C08L 27/18* (2013.01); *C08K 3/04* (2013.01); *C08K 3/042* (2017.05); *C08K 3/34* (2013.01); *C08K 3/346* (2013.01); *C08K 7/06* (2013.01); *C08K 7/14* (2013.01); *C09K 3/10* (2013.01); *F16J 9/28* (2013.01); *F16J 15/20* (2013.01); *F16J 15/3284* (2013.01); *C08K 2201/005* (2013.01); *C08K 2201/014* (2013.01)

(58) Field of Classification Search
CPC .......... C08L 27/18; C08K 3/042; C08K 3/34; C08K 3/346; C08K 7/06; C08K 7/14; C08K 3/04; C08K 2201/005; C08K 2201/014; C09K 3/10; F16J 15/20; F16J 15/3284; F16J 9/28
See application file for complete search history.

(56) References Cited

FOREIGN PATENT DOCUMENTS

| CN | 105542646 A | * | 5/2016 | ........... C09D 127/18 |
|---|---|---|---|---|
| CN | 107652594 A | * | 2/2018 | .............. C08L 27/18 |
| JP | 2004-138203 A | | 5/2004 | |
| JP | 2018087271 A | * | 6/2018 | ............... C08K 3/04 |

OTHER PUBLICATIONS

Machine English translation of JP 2018-087271, Hagi, Jun. 7, 2018.*
Machine English translation of CN 105542646, Li et al., May 4, 2016.*
Machine English translation of CN 107652594, Liu, Feb. 2, 2018.*
International Search Report of PCT/JP2020/028238 dated Sep. 29, 2020 [PCT/ISA/210].
Extended European Search Report issued Jul. 25, 2023 in European Application No. 20843393.8.
International Preliminary Report on Patentability dated Jan. 25, 2022 with a Translation of the Written Opinion of the International Searching Authority in Application No. PCT/JP2020/028238.

* cited by examiner

*Primary Examiner* — Patrick D Niland
(74) *Attorney, Agent, or Firm* — Sughrue Mion, PLLC

(57) ABSTRACT

A resin composition including polytetrafluoroethylene (A); graphite (B); talc (C); and an abrasion resistance-improving filler (D), the resin composition containing 50 to 80 parts by mass of the polytetrafluoroethylene (A), 1 to 35 parts by mass of the graphite (B), 1 to 35 parts by mass of the talc (C), 16 to 40 parts by mass of a total of the graphite (B) and the talc (C), and 2 to 10 parts by mass of the abrasion resistance-improving filler (D) relative to 100 parts by mass of a total of the polytetrafluoroethylene (A), the graphite (B), the talc (C), and the abrasion resistance-improving filler (D). Also disclosed is a molded article obtained by compression molding, extrusion molding, or injection molding the resin composition.

13 Claims, 1 Drawing Sheet

RESIN COMPOSITION, MOLDED ARTICLE, AND AUTOMATIC TRANSMISSION

CROSS REFERENCE TO RELATED APPLICATIONS

This application is a Rule 53(b) Continuation Application of International Application No. PCT/JP2020/028238 filed Jul. 21, 2020, claiming priority from Japanese Patent Application No. 2019-137107 filed Jul. 25, 2019, the respective disclosures of which are incorporated herein by reference in their entirety.

TECHNICAL FIELD

The disclosure relates to resin compositions, molded articles, and automatic transmissions.

BACKGROUND ART

Polytetrafluoroethylene is known to be used with a filler in order to improve mechanical properties.

For example, Patent Literature 1 discloses a fluorine-containing sliding material including a polytetrafluoroethylene and a chlorite, the chlorite being present in an amount of 1 to 49% by mass of a total mass of the polytetrafluoroethylene resin and the chlorite.

CITATION LIST

Patent Literature

Patent Literature 1: JP 2004-138203 A

SUMMARY

The disclosure relates to a resin composition including: polytetrafluoroethylene (A); graphite (B); talc (C); and an abrasion resistance-improving filler (D), the resin composition containing 50 to 90 parts by mass of the polytetrafluoroethylene (A), 1 to 35 parts by mass of the graphite (B), 1 to 35 parts by mass of the talc (C), 16 to 40 parts by mass of a total of the graphite (B) and the talc (C), and 2 to 10 parts by mass of the abrasion resistance-improving filler (D) relative to 100 parts by mass of a total of the polytetrafluoroethylene (A), the graphite (B), the talc (C), and the abrasion resistance-improving filler (D).

Advantageous Effects

The resin composition of the disclosure is capable of providing a molded article achieving both low-torque properties and high durability.

DESCRIPTION OF EMBODIMENTS

Figure 1:
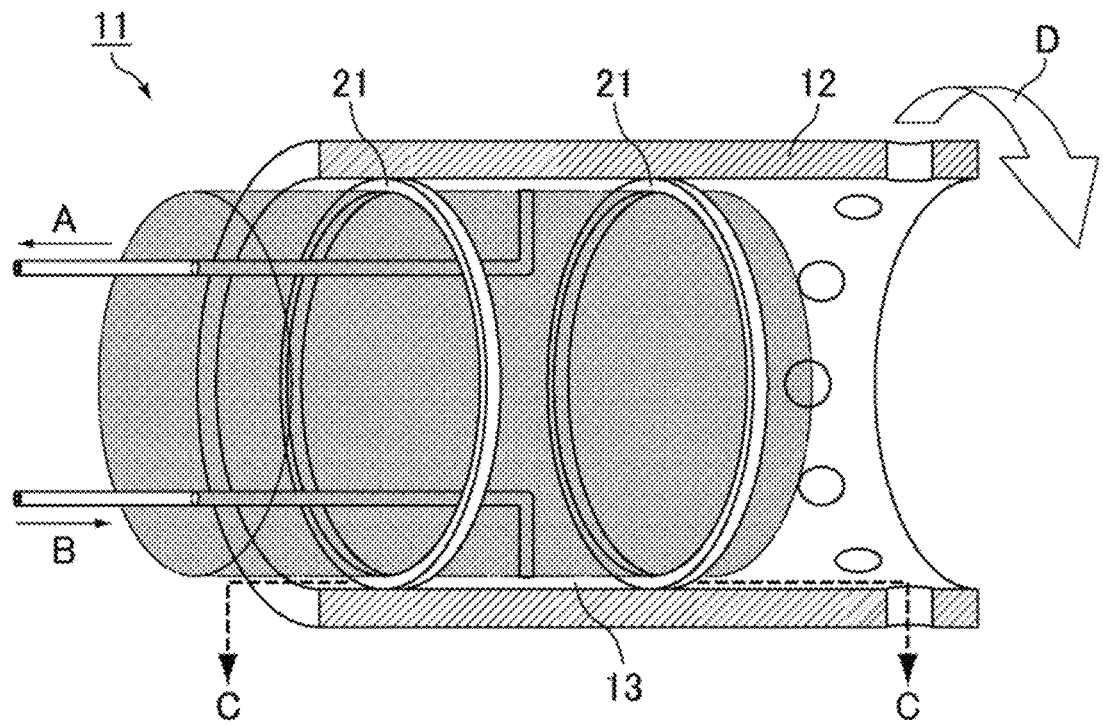
FIG. 1 is a schematic view of an AT seal ring evaluation tester for determining the torque coefficient and durability of seal rings obtained in examples and comparative examples.

The resin composition of the disclosure is specifically described hereinbelow.

The resin composition of the disclosure includes: polytetrafluoroethylene (PTFE) (A); graphite (B); talc (C); and an abrasion resistance-improving filler (D), the resin composition containing 50 to 90 parts by mass of the polytetrafluoroethylene (A), 1 to 35 parts by mass of the graphite (B), 1 to 35 parts by mass of the talc (C), 16 to 40 parts by mass of a total of the graphite (B) and the talc (C), and 2 to 10 parts by mass of the abrasion resistance-improving filler (D) relative to 100 parts by mass of a total of the polytetrafluoroethylene (A), the graphite (B), the talc (C), and the abrasion resistance-improving filler (D).

Molded articles formed from conventional resin compositions have sufficient durability but has insufficient low-torque properties, and thus still have room for achieving both low-torque properties and durability.

The resin composition of the disclosure contains the PTFE (A), the graphite (B), the talc (C), and the abrasion resistance-improving filler (D) at a certain ratio and thereby can provide a molded article achieving both low-torque properties and high durability.

The PTFE (A) may be a homo PTFE consisting only of a TFE unit or a modified PTFE containing a TFE unit and a modifying monomer unit based on a modifying monomer copolymerizable with TFE, and is preferably a modified PTFE.

The PTFE (A) may be a high molecular weight PTFE that is non-melt processable and fibrillatable or a low molecular weight PTFE that is melt-fabricable and non-fibrillatable, and is preferably a high molecular weight PTFE that is non-melt processable and fibrillatable.

Preferably, the modified PTFE contains 99.0% by mass or more of a TFE-based polymerized unit and 1.0% by mass or less of a modifying monomer-based polymerized unit.

Preferably, the modified PTFE contains the modifying monomer-based polymerized unit (hereinafter, also referred to as a "modifying monomer unit") in an amount within the range of 0.00001 to 1.0% by mass. The lower limit of the modifying monomer unit is more preferably 0.0001% by mass, still more preferably 0.0005% by mass, further more preferably 0.001% by mass, still further more preferably 0.005% by mass, particularly preferably 0.009% by mass. The upper limit of the modifying monomer unit is preferably 0.90% by mass, more preferably 0.50% by mass, still more preferably 0.40% by mass, further more preferably 0.30% by mass, still further more preferably 0.10% by mass, particularly preferably 0.08% by mass, more particularly preferably 0.05% by mass, still more particularly preferably 0.01% by mass.

The modifying monomer unit herein means a moiety of the molecular structure of the PTFE (A) and is derived from a modifying monomer.

The amount of each monomer defining the PTFE (A) herein can be calculated by an appropriate combination of NMR, FT-IR, elemental analysis, and X-ray fluorescence analysis according to the type of the monomer.

The modifying monomer may be any modifying monomer copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); a perfluorovinyl ether; a perfluoroalkyl ethylene; ethylene; and a fluorine-containing vinyl ether containing a nitrile group. One or more of modifying monomers may be used.

An example of the perfluorovinyl ether is, but not limited to, an unsaturated perfluoro compound represented by the following formula (1):

$$CF_2=CF-ORf^1 \qquad (1)$$

(wherein $Rf^1$ is a perfluoro organic group). The "perfluoro organic group" herein means an organic group in which all hydrogen atoms bonded to a carbon atom are replaced with fluorine atoms. The perfluoro organic group may contain ether oxygen.

Examples of the perfluorovinyl ether include a perfluoro (alkyl vinyl ether) (PAVE) represented by the formula (1) in which $Rf^1$ is a C1-C10 perfluoroalkyl group. The perfluoroalkyl group preferably has a carbon number of 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group, and preferred is perfluoropropyl vinyl ether (PPVE) whose perfluoroalkyl group is a perfluoropropyl group.

Examples of the perfluorovinyl ether include: those represented by the formula (1) in which $Rf^1$ is a C4-C9 perfluoro(alkoxy alkyl) group; those represented by the formula (1) in which $Rf^1$ is a group represented by the following formula:

[Chem. 1]

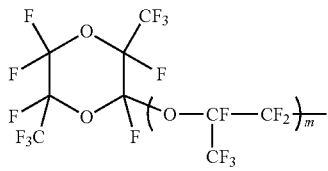

(wherein m is 0 or an integer of 1 to 4); and those represented by the formula (1) in which $Rf^1$ is a group represented by the following formula:

[Chem. 2]

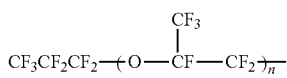

(wherein n is an integer of 1 to 4).

Examples of the perfluoroalkyl ethylene include, but are not limited to, perfluorobutyl ethylene (PFBE), perfluorohexyl ethylene, and (perfluorooctyl)ethylene.

The fluorine-containing vinyl ether containing a nitrile group is more preferably a fluorine-containing vinyl ether represented by $CF_2=CFORf^2CN$ (wherein $Rf^2$ is a C2-C7 alkylene group optionally containing an oxygen atom between two carbon atoms).

Preferably, the modifying monomer in the modified PTFE includes at least one selected from the group consisting of HFP, CTFE, VDF, PPVE, PFBE, and ethylene. More preferred is at least one monomer selected from the group consisting of PPVE, HFP, and CTFE.

Another preferred example of the modifying monomer is a comonomer (3) having a monomer reactivity ratio of 0.1 to 8. The presence of the comonomer (3) can provide PTFE particles having small particle sizes and thus can give an aqueous dispersion with high dispersion stability.

Here, the monomer reactivity ratio in copolymerization with TFE indicates a value obtained by dividing the rate constant in a reaction between TFE and propagating radicals, the number of which is smaller than the number of TFE-based repeating units, by the rate constant in a reaction between the propagating radicals and the comonomer. The lower the monomer reactivity ratio is, the higher the reactivity between the comonomer and TFE is. The monomer reactivity ratio can be obtained by copolymerizing TFE and the comonomer, determining the composition of the generated polymer immediately after starting of the copolymerization, and calculating the monomer reactivity ratio according to the Fineman-Ross equation.

The copolymerization is performed with a stainless steel autoclave having an inner capacity of 6.0 L charged with 3600 g of deionized and deaerated water, ammonium perfluorooctanoate in an amount of 1000 ppm relative to the water, and 100 g of paraffin wax at a pressure of 0.78 MPa and a temperature of 70° C. A reactor vessel is charged with 0.05 g, 0.1 g, 0.2 g, 0.5 g, or 1.0 g of the comonomer, 0.072 g of ammonium persulfate (20 ppm relative to the water) is added thereto, and TFE is continually supplied so as to maintain the polymerization pressure at 0.78 MPa. When the amount of TFE fed reaches 1000 g, the stirring is stopped and the reactor vessel is depressurized until the pressure in the reactor vessel comes to atmospheric pressure. After cooling, paraffin wax is separated, whereby an aqueous dispersion containing a generated polymer is obtained. The aqueous dispersion is stirred to allow the generated polymer to coagulate, and the coagulated polymer is then dried at 150° C. The composition of the generated polymer is calculated by an appropriate combination of NMR, FT-IR, elemental analysis, and X-ray fluorescence analysis according to the types of the monomers.

The comonomer (3) having a monomer reactivity ratio of 0.1 to 8 preferably includes at least one selected from the group consisting of comonomers represented by the formulas (3a) to (3d):

$$CH_2=CH-Rf^1 \quad (3a)$$

(wherein $Rf^1$ is a C1-C10 perfluoroalkyl group);

$$CF_2=CF-O-Rf^2 \quad (3b)$$

(wherein $Rf^2$ is a C1-C2 perfluoroalkyl group);

$$CF_2=CF-O-(CF_2)_nCF=CF_2 \quad (3c)$$

(wherein n is 1 or 2); and

[Chem. 3]

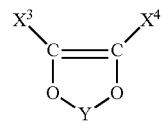

(3d)

(wherein $X^3$ and $X^4$ are each F, Cl, or a methoxy group, and Y is represented by the formula Y1 or the formula Y2)

[Chem. 4]

$$-CF=CF- \quad (Y1)$$

(Y2)

(in the formula Y2, Z and Z' are each F or a C1-C3 fluorinated alkyl group).

Preferably, the comonomer (3) is present in an amount within the range of 0.00001 to 1.0% by mass relative to the PTFE (A). The lower limit thereof is more preferably 0.0001% by mass, still more preferably 0.0005% by mass, further more preferably 0.001% by mass, still further more preferably 0.005% by mass, particularly preferably 0.009% by mass. The upper limit thereof is preferably 0.90% by mass, more preferably 0.50% by mass, still more preferably 0.40% by mass, further more preferably 0.30% by mass, still further more preferably 0.10% by mass, particularly preferably 0.08% by mass, more particularly preferably 0.05% by mass, still more particularly preferably 0.01% by mass.

In order to provide modified polytetrafluoroethylene particles whose primary particles have a small average primary particle size and a small aspect ratio and to provide an aqueous dispersion having excellent stability, the modifying monomer preferably includes at least one selected from the group consisting of hexafluoropropylene, vinylidene fluoride, a fluoro(alkyl vinyl ether), a (perfluoroalkyl)ethylene, ethylene, and a modifying monomer containing a functional group reactive by radical polymerization and a hydrophilic group. Use of such modifying monomer(s) can provide an aqueous dispersion of a PTFE having a smaller average primary particle size, a smaller aspect ratio of primary particles, and better dispersion stability. Use of such modifying monomer(s) can also provide an aqueous dispersion with a smaller amount of uncoagulated polymers.

In terms of the reactivity with TFE, the modifying monomer preferably includes at least one selected from the group consisting of hexafluoropropylene, a perfluoro(alkyl vinyl ether), and a (perfluoroalkyl)ethylene.

More preferably, the modifying monomer includes at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

Preferably, the sum of the amounts of the hexafluoropropylene unit, the perfluoro(alkyl vinyl ether) unit, and the (perfluoroalkyl)ethylene unit is within the range of 0.00001 to 1% by mass relative to the PTFE (A). The lower limit of the sum is more preferably 0.0001% by mass, still more preferably 0.0005% by mass, further more preferably 0.001% by mass, still further more preferably 0.005% by mass, particularly preferably 0.009% by mass. The upper limit thereof is more preferably 0.50% by mass, still more preferably 0.40% by mass, further more preferably 0.30% by mass, still further more preferably 0.10% by mass, particularly preferably 0.08% by mass, more particularly preferably 0.05% by mass, still more particularly preferably 0.01% by mass.

Also, the modifying monomer preferably includes a modifying monomer containing a functional group reactive by radical polymerization and a hydrophilic group (hereinafter, referred to as a "modifying monomer (A)").

The presence of the modifying monomer (A) can provide PTFE particles with small primary particle sizes and thus can give an aqueous dispersion having high dispersion stability. Also, the presence of the modifying monomer (A) can reduce the amount of uncoagulated polymers and moreover can reduce the aspect ratio of primary particles.

The modifying monomer (A) is preferably used in an amount exceeding the amount corresponding to 0.1 ppm of an aqueous medium, more preferably in an amount exceeding 0.5 ppm thereof, still more preferably in an amount exceeding 1.0 ppm thereof, further more preferably in an amount equal to or more than 5 ppm thereof, particularly preferably in an amount equal to or more than 10 ppm thereof. Too small an amount of the modifying monomer (A) may fail to reduce the average primary particle size of the resulting PTFE.

The amount of the modifying monomer (A) may have any upper limit within the above range and may have an upper limit of 5000 ppm, for example. In the production method, the modifying monomer (A) may be added to the system in the middle of the reaction in order to improve the stability of the aqueous dispersion during or after the reaction.

Even when an unreacted portion of the modifying monomer (A) remains in the aqueous dispersion, the portion can be easily removed in a condensation step or a coagulation and washing step because the modifying monomer (A) has high water-solubility.

The modifying monomer (A) is taken in a generated polymer during polymerization. Fortunately, the concentration of the modifying monomer (A) itself is low in the polymerization system and thus the amount thereof to be taken in the polymer is small. The modifying monomer (A) thus does not cause the PTFE to have defects such as reduced heat resistance and coloring after baking.

Examples of the hydrophilic group of the modifying monomer (A) include —NH$_2$, —PO$_3$M, —OPO$_3$M, —SO$_3$M, —OSO$_3$M, and —COOM (in each of the formulas, M is H, a metal atom, NR$^7_4$, imidazolium optionally containing a substituent, pyridinium optionally containing a substituent, or phosphonium optionally containing a substituent, wherein R$^7$s are each H or an organic group and may be the same as or different from each other, and any two of R$^7$s may be bonded to each other to form a ring). Preferred hydrophilic groups among these are —SO$_3$M and —COOM. The organic group for R$^7$ is preferably an alkyl group. R$^7$ is preferably H or a C$_{1-10}$ organic group, more preferably H or a C$_{1-4}$ organic group, still more preferably H or a C$_{1-4}$ alkyl group.

Examples of the metal atom include monovalent or divalent metal atoms, alkali metal (Group 1) atoms, and alkaline-earth metal (Group 2) atoms, and preferred are Na, K, and Li.

Examples of the "functional group reactive by radical polymerization" of the modifying monomer (A) include unsaturated ethylenic bond-containing groups such as a vinyl group and an allyl group. The unsaturated ethylenic bond-containing group can be represented by the following formula:

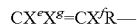

(wherein X$^e$, X$^f$, and X$^g$ are each independently F, Cl, H, CF$_3$, CF$_2$H, CFH$_2$, or CH$_3$; and R is a linking group). Examples of the linking group for R include those exemplified as the linking group for R$^a$ described later. Preferred are unsaturated bond-containing groups such as —CH=CH$_2$, —CF=CH$_2$, —CH=CF$_2$, —CF=CF$_2$, —CH$_2$—CH=CH$_2$, —CF$_2$—CF=CH$_2$, —CF$_2$—CF=CF$_2$, —(C=O)—CH=CH$_2$, —(C=O)—CF=CH$_2$, —(C=O)—CH=CF$_2$, —(C=O)—CF=CF$_2$, —(C=O)—C(CH$_3$)=CH$_2$, —(C=O)—C(CF$_3$)=CH$_2$, —(C=O)—C(CH$_3$)=CF$_2$, —(C=O)—C(CF$_3$)=CF$_2$, —O—CH$_2$—CH=CH$_2$, —O—CF$_2$—CF=CH$_2$, —O—CH$_2$—CH=CF$_2$, and —O—CF$_2$—CF=CF$_2$.

When the modifying monomer (A), which contains a functional group reactive by radical polymerization, is used in the polymerization, the modifying monomer (A) reacts with a fluorine-containing monomer at an initial stage of the polymerization reaction. Presumably, resulting particles thus contain a hydrophilic group derived from the modifying monomer (A) and have high stability. Accordingly, polymerization in the presence of the modifying monomer (A) presumably increases the number of particles.

The polymerization may be performed in the presence of one kind or two or more kinds of the modifying monomer(s) (A).

In the polymerization, an unsaturated bond-containing compound may be used as the modifying monomer (A).

The modifying monomer (A) is preferably a compound represented by the formula (4):

$$CX^iX^k=CX^jR^a—(CZ^1Z^2)_k—Y^3 \quad (4)$$

(wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1).

Examples of the hydrophilic group include —$NH_2$, —$PO_3M$, —$OPO_3M$, —$SO_3M$, —$OSO_3M$, and —COOM (in each of the formulas, M is H, a metal atom, $NR^7_4$, imidazolium optionally containing a substituent, pyridinium optionally containing a substituent, or phosphonium optionally containing a substituent, wherein $R^7$s are each H or an organic group and may be the same as or different from each other, and any two of $R^7$s may be bonded to each other to form a ring). Preferred hydrophilic groups among these are —$SO_3M$ and —COOM. The organic group for $R^7$ is preferably an alkyl group. $R^7$ is preferably H or a $C_{1-10}$ organic group, more preferably H or a $C_{1-4}$ organic group, still more preferably H or a $C_{1-4}$ alkyl group.

Examples of the metal atom include monovalent or divalent metal atoms, alkali metal (Group 1) atoms, and alkaline-earth metal (Group 2) atoms, and preferred are Na, K, and Li.

Use of the modifying monomer (A) can provide an aqueous dispersion having a smaller average primary particle size and better dispersion stability and moreover can further reduce the aspect ratio of primary particles.

$R^a$ is a linking group. The "linking group" herein indicates a divalent linking group. The linking group may be a single bond and preferably contains at least one carbon atom. The number of carbon atoms may be 2 or more, 4 or more, 8 or more, 10 or more, or 20 or more. The upper limit thereof may be, but is not limited to, 100 or less or 50 or less, for example.

The linking group may have a linear, branched, cyclic, or acyclic structure, may be saturated or unsaturated, may be substituted or unsubstituted, optionally contains at least one hetero atom selected from the group consisting of sulfur, oxygen, and nitrogen atoms, and optionally contains at least one functional group selected from the group consisting of ester, amide, sulfonamide, carbonyl, carbonate, urethane, urea, and carbamate groups. The linking group may not contain a carbon atom and may be a catenary heteroatom such as an oxygen, sulfur, or nitrogen atom.

Preferably, $R^a$ is a catenary heteroatom such as an oxygen, sulfur, or nitrogen atom or a divalent organic group.

When $R^a$ is a divalent organic group, its hydrogen atom(s) bonded to a carbon atom may be replaced by a halogen atom other than a fluorine atom, such as a chlorine atom, and $R^a$ may or may not contain a double bond. $R^a$ may be linear or branched and may be cyclic or acyclic. $R^a$ may contain a functional group (e.g., an ester, an ether, a ketone, an amine, or a halide).

$R^a$ may be a fluorine-free divalent organic group or a partially fluorinated or perfluorinated divalent organic group.

Examples of $R^a$ include: a hydrocarbon group in which no fluorine atom is bonded to a carbon atom; a hydrocarbon group in which hydrogen atoms bonded to carbon atom(s) are partially replaced by fluorine atom(s); a hydrocarbon group in which all hydrogen atoms bonded to carbon atom(s) are replaced by fluorine atoms; —(C=O)—; —(C=O)—O—; and a hydrocarbon group containing —(C=O)—. These hydrocarbon groups may contain an oxygen atom, may contain a double bond, and may contain a functional group.

Preferably, $R^a$ is —(C=O)—, —(C=O)—O—, or a C1-C100 hydrocarbon group optionally containing an ether bond and optionally containing a carbonyl group. In the hydrocarbon group, all or part of hydrogen atoms bonded to carbon atom(s) may be replaced by fluorine atom(s).

Preferred examples of $R^a$ include at least one selected from the group consisting of —$(CH_2)_a$—, —$(CF_2)_a$—, —O—$(CF_2)_a$—, —$(CF_2)_a$—O—$(CF_2)_b$—, —O$(CF_2)_a$O—$(CF_2)_b$—, —$(CF_2)_a$—[O—$(CF_2)_b]_c$—, —O$(CF_2)_a$[O—$(CF_2)_b]_c$—, —[$(CF_2)_a$—O]b-[$(CF_2)_c$—O]—, —O[$(CF_2)_a$—O]$_b$—[$(CF_2)$—O]$_d$—, —O—[$CF_2CF(CF_3)O]_a$—$(CF_2)_b$—, —(C=O)—, —(C=O)—O—, —(C=O)—$(CH_2)_a$—, —(C=O)—$(CF_2)_a$—, —(C=O)—O—$(CH_2)_a$—, —(C=O)—O—$(CF_2)_a$—, —(C=O)—[$(CH_2)_a$—O]$_b$—, —(C=O)—[$(CF_2)_a$—O]$_b$—, —(C=O)—O[$(CH_2)_a$—O]$_b$—, —(C=O)—O[$(CF_2)_a$—O]$_b$—, —(C=O)—O[$(CH_2)_a$—O]$_b$—$(CH_2)_c$—, —(C=O)—O[$(CF_2)_a$—O]$_b$—$(CF_2)_c$—, —(C=O)—$(CH_2)_a$—O—$(CH_2)_b$—, —(C=O)—$(CF_2)_a$—O—$(CF_2)_b$—, —(C=O)—O—$(CH_2)_a$—O—$(CH_2)_b$—, —(C=O)—O—$(CF_2)_a$—O—$(CF_2)_b$—, —(C=O)—O—$C_6H_4$—, and combinations of any of these.

In the formulas, a, b, c, and d each independently represent at least 1 or more; a, b, c, and d may each independently represent 2 or more, 3 or more, 4 or more, 10 or more, or 20 or more; and the upper limit of each of a, b, c, and d is 100, for example.

Preferred specific examples of $R^a$ include Suitable specific examples of $R^a$ include —$CF_2$—O—, —$CF_2$—O—$CF_2$—, —$CF_2$—O—$CH_2$—, —$CF_2O$—$CH_2CF_2$—, —$CF_2$—O—$CF_2CF_2$—, —$CF_2$—O—$CF_2CH_2$—, —$CF_2$—O—$CF_2CF_2CH_2$—, —$CF_2$—O—$CF(CF_3)$—, —$CF_2$—O—$CF(CF_3)CF_2$—, —$CF_2$—O—$CF(CF_3)CF_2$—O—, —$CF_2$—O—$CF(CF_3)$ $CH_2$—, —(C=O)—, —(C=O)—O—, —(C=O)—$(CH_2)$—, —(C=O)—$(CF_2)$—, —(C=O)—O—$(CH_2)$—, —(C=O)—O—$(CF_2)$—, —(C=O)—[$(CH_2)_2$—O]$_n$—, —(C=O)—[$(CF_2)_2$—O]$_n$—, —(C=O)—O[$(CH_2)_2$—O]$_n$—, —(C=O)—O[$(CF_2)_2$—O]$_n$—, —(C=O)—O[$(CH_2)_2$—O]$_n$—$(CH_2)$—, —(C=O)—O[$(CF_2)_2$-]$_n$—$(CF_2)$—, —(C=O)—$(CH_2)_2$—O—$(CH_2)$—, —(C=O)—$(CF_2)_2$—O—$(CF_2)$—, —(C=O)—O—$(CH_2)_2$—O—$(CH_2)$—, —(C=O)—O—$(CF_2)_2$—O—$(CF_2)$—, and —(C=O)—O—$C_6H_4$—. In particular, $R^a$ is specifically preferably —$CF_2$—O—, —$CF_2$—O—$CF_2$—, —$CF_2$—O—$CF_2CF_2$—, —$CF_2$—O—$CF(CF_3)$—, —$CF_2$—O—$CF(CF_3)CF_2$—, —$CF_2$—O—$CF(CF_3)CF_2$—O—, —(C=O)—, —(C=O)—O—, —(C=O)—$(CH_2)$—, —(C=O)—O—$(CH_2)$—, —(C=O)—O[$(CH_2)_2$—O]$_n$—, —(C=O)—O[$(CH_2)_2$—O]$_n$—$(CH_2)$—, —(C=O)—$(CH_2)_2$—O—$(CH_2)$—, or —(C=O)—O—$C_6H_4$—.

In the above formulas, n is an integer of 1 to 10.

Preferred examples of —$R^a$—$(CZ^1Z^2)_k$ in the formula (4) include —$CF_2$—O—$CF_2$—, —$CF_2$—O—$CF(CF_3)$—, —$CF_2$—O—$C(CF_3)_2$—, —$CF_2$—O—$CF_2$—$CF_2$—, —$CF_2$—O—$CF_2$—$CF(CF_3)$—, —$CF_2$—O—$CF_2$—$C(CF_3)_2$—, —$CF_2$—O—$CF_2CF_2$—$CF_2$—, —$CF_2$—O—$CF_2CF_2$—$CF(CF_3)$—, —$CF_2$—O—$CF_2CF_2$—$C(CF_3)_2$—, —$CF_2$—O—$CF(CF_3)$—$CF_2$—, —$CF_2$—O—$CF(CF_3)$—$CF(CF_3)$—, —$CF_2$—O—$CF(CF_3)$—$C(CF_3)_2$—, —$CF_2$—O—

—CF(CF$_3$)—CF$_2$—, —CF$_2$—O—CF(CF$_3$)—CF(CF$_3$)—, —CF$_2$—O—CF(CF$_3$)—C(CF$_3$)$_2$—, —CF$_2$—O—CF(CF$_3$)CF$_2$—CF$_2$—, —CF$_2$—O—CF(CF$_3$)CF$_2$—CF(CF$_3$)—, —CF$_2$—O—CF(CF$_3$)CF$_2$—C(CF$_3$)$_2$—, —CF$_2$—O—CF(CF$_3$)CF$_2$—O—CF$_2$—, —CF$_2$—O—CF(CF$_3$)CF$_2$—O—CF(CF$_3$)—, —CF$_2$—O—CF(CF$_3$)CF$_2$—O—C(CF$_3$)$_2$—, —(C=O)—, —(C=O)—O—, —(C=O)—(CH$_2$)—, —(C=O)—(CF$_2$)—, —(C=O)—O—(CH$_2$)—, —(C=O)—O—(CF$_2$)—, —(C=O)—[(CH$_2$)$_2$—]$_n$—(CH$_2$)—, —(C=O)—[(CF$_2$)$_2$—O]$_n$—(CF$_2$)—, —(C=O)—[(CH$_2$)$_2$—O]$_n$—(CH$_2$)—(CH$_2$)—, —(C=O)—[(CF$_2$)$_2$—O]$_n$—(CF$_2$)—(CF$_2$)—, —(C=O)—O[(CH$_2$)$_2$—O]$_n$—(CH$_2$)—, —(C=O)—O[(CH$_2$)$_2$—O]$_n$—(CH$_2$)—(CH$_2$)—, —(C=O)—O[(CF$_2$)$_2$—O]$_n$—(CF$_2$)—, —(C=O)—O[(CF$_2$)$_2$—O]$_n$—(CF$_2$)—(CF$_2$)—, —(C=O)—(CH$_2$)$_2$—O—(CH$_2$)—(CH$_2$)—, —(C=O)—(CF$_2$)$_2$—O—(CF$_2$)—(CF$_2$)—, —(C=O)—O—(CH$_2$)$_2$—O—(CH$_2$)—(CH$_2$)—, —(C=O)—O—(CF$_2$)$_2$—O—(CF$_2$)—(CF$_2$)—, —(C=O)—O—(CH$_2$)$_2$—O—(CH$_2$)—C(CF$_3$)$_2$—, —(C=O)—O—(CF$_2$)$_2$—O—(CF$_2$)—C(CF$_3$)$_2$—, and —(C=O)—O—C$_6$H$_4$—C(CF$_3$)$_2$—, and more preferred examples thereof include —CF$_2$—O—CF(CF$_3$)—, —CF$_2$—O—CF$_2$—CF(CF$_3$)—, —CF$_2$—O—CF$_2$CF$_2$—CF(CF$_3$)—, —CF$_2$—O—CF(CF$_3$)—CF(CF$_3$)—, —CF$_2$—O—CF(CF$_3$)CF$_2$—CF(CF$_3$)—, —CF$_2$—O—CF(CF$_3$)CF$_2$—O—CF(CF$_3$)—, —(C=O)—, —(C=O)—O—(CH$_2$)—, —(C=O)—O—(CH$_2$)—(CH$_2$)—, —(C=O)—O[(CH$_2$)$_2$—O]$_n$—(CH$_2$)—(CH$_2$)—, —(C=O)—O—(CH$_2$)$_2$—O—(CH$_2$)—C(CF$_3$)$_2$—, and —(C=O)—O—C$_6$H$_4$—C(CF$_3$)$_2$—.

In the formulas, n is an integer of 1 to 10.

Specific examples of the compound represented by the formula (4) include:

[Chem. 5]

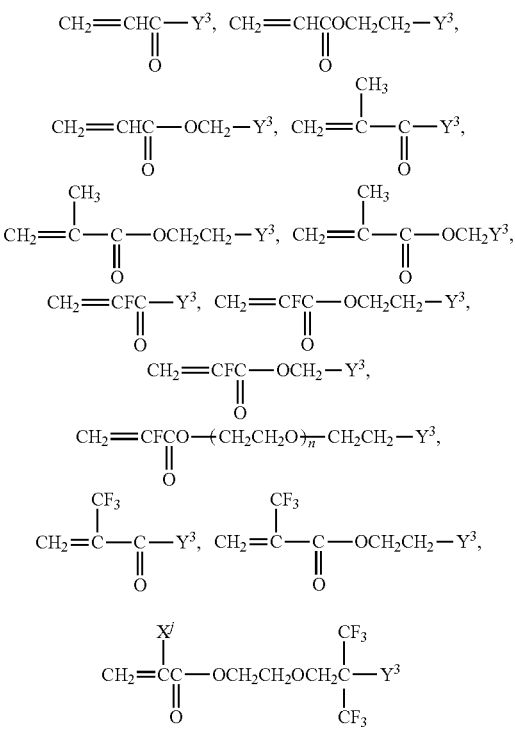

-continued

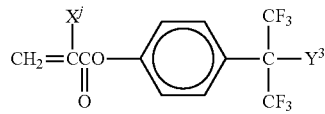

(ii)

wherein $X^j$ and $Y^3$ are as defined above; and n is an integer of 1 to 10.

$R^a$ is preferably a divalent group represented by the following formula (r1):

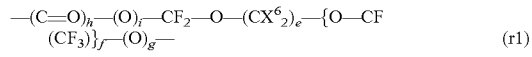

(wherein $X^6$s are each independently H, F, or CF$_3$; e is an integer of 0 to 3; f is an integer of 0 to 3; g is 0 or 1; h is 0 or 1; and i is 0 or 1), and is also preferably a divalent group represented by the following formula (r2):

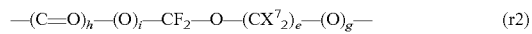

(wherein $X^7$s are each independently H, F, or CF$_3$; e is an integer of 0 to 3; g is 0 or 1; h is 0 or 1; and i is 0 or 1).

In the formula (4), —$R^a$—$CZ^1Z^2$— is also preferably a divalent group represented by the following formula (t1):

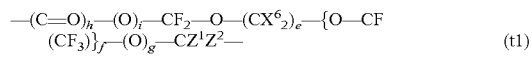

(wherein $X^6$s are each independently H, F, or CF$_3$; e is an integer of 0 to 3; f is an integer of 0 to 3; g is 0 or 1; h is 0 or 1; i is 0 or 1; and $Z^1$ and $Z^2$ are each independently F or CF$_3$), more preferably a divalent group represented by the formula (t1) in which one selected from the group consisting of $Z^1$ and $Z^2$ is F and the other is CF$_3$.

In the formula (4), the moiety —$R^a$—$CZ^1Z^2$— is also preferably a divalent group represented by the following formula (t2):

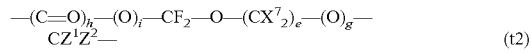

(wherein $X^7$s are each independently H, F, or CF$_3$; e is an integer of 0 to 3; g is 0 or 1; h is 0 or 1; i is 0 or 1; and $Z^1$ and $Z^2$ are each independently H, F, or CF$_3$), more preferably a divalent group represented by the formula (t2) in which one of $Z^1$ and $Z^2$ is F and the other is CF$_3$.

Preferably, the moiety other than the hydrophilic group ($Y^3$) in the compound represented by the formula (4) contains a C—F bond and does not contain a C—H bond. In other words, preferably, all of $X^i$, $X^j$, and $X^k$ in the formula (4) are F, and $R^a$ is a perfluoroalkylene group having one or more carbon atoms. The perfluoroalkylene group may be linear or branched, may be cyclic or acyclic, and may contain at least one catenary heteroatom. The carbon number of the perfluoroalkylene group may be 2 to 20 or 4 to 18.

The compound represented by the formula (4) may be partially fluorinated. In other words, preferably, the moiety other than the hydrophilic group ($Y^3$) in the compound represented by the formula (4) contains at least one hydrogen atom bonded to a carbon atom and at least one fluorine atom bonded to a carbon atom.

Also, the compound represented by the formula (4) is preferably a compound represented by the following formula (4a):

wherein $Y^3$ is a hydrophilic group; and $Rf^0$ is a perfluorinated divalent linking group which is perfluorinated, may have a linear, branched, cyclic, or acyclic structure, may be saturated or unsaturated, may be substituted or unsubstituted, and optionally contains one or more additional hetero atoms selected from the group consisting of sulfur, oxygen, and nitrogen atoms.

Also, the compound represented by the formula (4) is preferably a compound represented by the following formula (4b):

$$CH_2=CH-O-Rf^o-Y^3 \quad (4b)$$

wherein $Y^3$ is a hydrophilic group; and $Rf^o$ is a perfluorinated divalent linking group defined by the formula (4a).

In a preferred embodiment, $Y^3$ in the formula (4) is —$OSO_3M$. When $Y^3$ is —$OSO_3M$, examples of the polymerized unit based on the compound represented by the formula (4) include —[$CF_2CF(OCF_2CF_2CH_2OSO_3M)$]—, —[$CH_2CH((CF_2)_4CH_2OSO_3M)$]—, —[$CF_2CF(O(CF_2)_4CH_2OSO_3M)$]—, —[$CF_2CF(OCF_2CF(CF_3)CH_2OSO_3M)$]—, —[$CF_2CF(OCF_2CF(CF_3)OCF_2CF_2CH_2OSO_3M)$]—, —[$CH_2CH((CF_2)_4CH_2OSO_3M)$]—, —[$CF_2CF(OCF_2CF_2SO_2N(CH_3)CH_2CH_2OSO_3M)$]—, —[$CH_2CH(CF_2CF_2CH_2OSO_3M)$]—, —[$CF_2CF(OCF_2CF_2CF_2CF_2SO_2N(CH_3)CH_2CH_2OSO_3M)$]—, and —[$CH_2CH(CF_2CF_2CH_2OSO_3M)$]—. In the above formulas, M is as defined above.

In a preferred embodiment, $Y^3$ in the formula (4) is —$SO_3M$. When $Y^3$ is —$SO_3M$, examples of the polymerized unit based on the compound represented by the formula (4) include —[$CF_2CF(OCF_2CF_2SO_3M)$]—, —[$CF_2CF(O(CF_2)_4SO_3M)$]—, —[$CF_2CF(OCF_2CF(CF_3)SO_3M)$]—, —[$CF_2CF(OCF_2CF(CF_3)OCF_2CF_2SO_3M)$]—, —[$CH_2CH(CF_2CF_2SO_3M)$]—, —[$CF_2CF(OCF_2CF(CF_3)OCF_2CF_2CF_2CF_2SO_3M)$]—, —[$CH_2CH((CF_2)_4SO_3M)$]—, —[$CH_2CH(CF_2CF_2SO_3M)$]—, and —[$CH_2CH((CF_2)_4SO_3M)$]—. In the above formulas, M is as defined above.

In a preferred embodiment, $Y^3$ in the formula (4) is —COOM. When $Y^3$ is—COOM, examples of the polymerized unit based on the compound represented by the formula (4) include —[$CF_2CF(OCF_2CF_2COOM)$]—, —[$CF_2CF(O(CF_2)_5COOM)$]—, —[$CF_2CF(OCF_2CF(CF_3)COOM)$]—, —[$CF_2CF(OCF_2CF(CF_3)O(CF_2)_nCOOM)$]— (wherein n is greater than 1), —[$CH_2CH(CF_2CF_2COOM)$]—, —[$CH_2CH((CF_2)_4COOM)$]—, —[$CH_2CH(CF_2CF_2COOM)$]—, —[$CH_2CH((CF_2)_4COOM)$]—, —[$CF_2CF(OCF_2CF_2SO_2NR'CH_2COOM)$]—, —[$CF_2CF(O(CF_2)_4SO_2NR'CH_2COOM)$]—, —[$CF_2CF(OCF_2CF(CF_3)SO_2NR'CH_2COOM)$]—, —[$CF_2CF(OCF_2CF(CF_3)OCF_2CF_2SO_2NR'CH_2COOM)$]—, —[$CH_2CH(CF_2CF_2SO_2NR'CH_2COOM)$]—, —[$CF_2CF(OCF_2CF(CF_3)OCF_2CF_2CF_2CF_2SO_2NR'CH_2COOM)$]—, —[$CH_2CH((CF_2)_4SO_2NR'CH_2COOM)$]—, —[$CH_2CH(CF_2CF_2SO_2NR'CH_2COOM)$]—, and —[$CH_2CH((CF_2)_4SO_2NR'CH_2COOM)$]. In the above formulas, R' is H or a $C_{1-4}$ alkyl group, and M is as defined above.

In a preferred embodiment, $Y^3$ in the formula (4) is —$OPO_3M$. When $Y^3$ is —$OPO_3M$, examples of the polymerized unit based on the compound represented by the formula (4) include —[$CF_2CF(OCF_2CF_2CH_2OP(O)(OM)_2)$]—, —[$CF_2CF(O(CF_2)_4CH_2OP(O)(OM)_2)$]—, —[$CF_2CF(OCF_2CF(CF_3)CH_2OP(O)(OM)_2)$]—, —[$CF_2CF(OCF_2CF(CF_3)OCF_2CF_2CH_2OP(O)(OM)_2)$]—, —[$CF_2CF(OCF_2CF_2SO_2N(CH_3)CH_2CH_2OP(O)(OM)_2)$]—, —[$CF_2CF(OCF_2CF_2CF_2CF_2SO_2N(CH_3)CH_2CH_2OP(O)(OM)_2)$]—, —[$CH_2CH(CF_2CF_2CH_2OP(O)(OM)_2)$]—, —[$CH_2CH((CF_2)_4CH_2OP(O)(OM)_2)$]—, —[$CH_2CH(CF_2CF_2CH_2OP(O)(OM)_2)$]—, and —[$CH_2CH((CF_2)_4CH_2OP(O)(OM)_2)$]—. In the above formulas, M is as defined above.

In a preferred embodiment, $Y^3$ in the formula (4) is —$PO_3M$. When $Y^3$ is —$PO_3M$, examples of the polymerized unit based on the compound represented by the formula (4) include —[$CF_2CF(OCF_2CF_2P(O)(OM)_2)$]—, —[$CF_2CF(O(CF_2)_4P(O)(OM)_2)$]—, —[$CF_2CF(OCF_2CF(CF_3)P(O)(OM)_2)$]—, —[$CF_2CF(OCF_2CF(CF_3)OCF_2CF_2P(O)(OM)_2)$]—, —[$CH_2CH(CF_2CF_2P(O)(OM)_2)$]—, —[$CH_2CH((CF_2)_4P(O)(OM)_2)$]—, —[$CH_2CH(CF_2CF_2P(O)(OM)_2)$]—, and —[$CH_2CH((CF_2)_4P(O)(OM)_2)$]—. In the above formulas, M is as defined above.

Preferably, the compound represented by the formula (4) includes at least one selected from the group consisting of:
a monomer represented by the following formula (5):

$$CX_2=CY(-CZ_2-O-Rf-Y^3) \quad (5)$$

(wherein Xs are the same as or different from each other and are each —H or —F; Y is —H, —F, an alkyl group, or a fluorine-containing alkyl group; Zs are the same as or different from each other and are each —H, —F, an alkyl group, or a fluorine-containing alkyl group; Rf is a C1-C40 fluorine-containing alkylene group or a C2-C100 fluorine-containing alkylene group containing an ether bond; and $Y^3$ is as defined above);

a monomer represented by the following formula (6):

$$CX_2=CY(-O-Rf-Y^3) \quad (6)$$

(wherein Xs are the same as or different from each other and are each —H or —F; Y is —H, —F, an alkyl group, or a fluorine-containing alkyl group; Rf is a C1-C40 fluorine-containing alkylene group or a C2-C100 fluorine-containing alkylene group containing an ether bond; and $Y^3$ is as defined above); and a monomer represented by the following formula (7):

$$CX_2=CY(-Rf-Y^3) \quad (7)$$

(wherein Xs are the same as or different from each other and are each —H or —F; Y is —H, —F, an alkyl group, or a fluorine-containing alkyl group; Rf is a C1-C40 fluorine-containing alkylene group or a C2-C100 fluorine-containing alkylene group containing an ether bond; and $Y^3$ is as defined above).

The C2-C100 fluorine-containing alkylene group containing an ether bond is an alkylene group that does not have a structure terminated with an oxygen atom and contains an ether bond between carbon atoms.

In the formula (5), Xs are each —H or —F. Both Xs may be —F, or at least one X may be —H. For example, one of the Xs may be —F and the other may be —H, or both Xs may be —H.

In the formula (5), Y is —H, —F, an alkyl group, or a fluorine-containing alkyl group.

The alkyl group is a fluorine-free alkyl group, and the carbon number thereof is 1 or more. The carbon number of the alkyl group is preferably 6 or less, more preferably 4 or less, still more preferably 3 or less.

The fluorine-containing alkyl group is an alkyl group containing at least one fluorine atom, and the carbon number thereof is 1 or more. The carbon number of the fluorine-containing alkyl group is preferably 6 or less, more preferably 4 or less, still more preferably 3 or less.

Y is preferably —H, —F, or —$CF_3$, more preferably —F.

In the formula (5), Zs are the same as or different from each other and are each —H, —F, an alkyl group, or a fluoroalkyl group.

The alkyl group is a fluorine-free alkyl group, and the carbon number thereof is 1 or more. The carbon number of the alkyl group is preferably 6 or less, more preferably 4 or less, still more preferably 3 or less.

The fluorine-containing alkyl group is an alkyl group containing at least one fluorine atom, and the carbon number thereof is 1 or more. The carbon number of the fluorine-containing alkyl group is preferably 6 or less, more preferably 4 or less, still more preferably 3 or less.

Z is preferably —H, —F, or —$CF_3$, more preferably —F.

In the formula (5), preferably, at least one selected from the group consisting of X, Y, and Z contains a fluorine atom. For example, X may be —H, and Y and Z may each be —F.

In the formula (5), Rf is a C1-C40 fluorine-containing alkylene group or a C2-C100 fluorine-containing alkylene group containing an ether bond.

The carbon number of the fluorine-containing alkylene group is preferably 2 or more. The carbon number is preferably 30 or less, more preferably 20 or less, still more preferably 10 or less. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. Preferably, the fluorine-containing alkylene group is a perfluoroalkylene group.

Preferably, the fluorine-containing alkylene group containing an ether bond has a carbon number of 3 or more, while preferably 60 or less, more preferably 30 or less, still more preferably 12 or less.

Also, the fluorine-containing alkylene group containing an ether bond is preferably a divalent group represented by the following formula:

[Chem. 6]

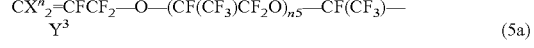

(wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and when $Z^3$ and $Z^4$ are both H, p1+q1+r1+s1 is not 0), for example.

Specific examples of the fluorine-containing alkylene group containing an ether bond include —$CF(CF_3)CF_2$—O—$CF(CF_3)$—, —$(CF(CF_3)CF_2$—O$)_n$—$CF(CF_3)$— (wherein n is an integer of 1 to 10), —$CF(CF_3)CF_2$—O—$CF(CF_3) CH_2$—, —$(CF(CF_3)CF_2$—O$)_n$—$CF(CF_3)CH_2$— (wherein n is an integer of 1 to 10), —$CH_2CF_2CF_2O$—$CH_2CF_2CH_2$—, —$CF_2CF_2CF_2O$—$CF_2CF_2$—, —$CF_2CF_2CF_2O$—$CF_2CF_2CH_2$—, —$CF_2CF_2O$—$CF_2$—, —$CF_2CF_2O$—$CF_2CH_2$—, and —$CF(CF_3) CH_2$—.

Preferably, the fluorine-containing alkylene group containing an ether bond is a perfluoroalkylene group.

In the formula (5), $Y^3$ is —COOM, —$SO_3M$, or —$OSO_3M$ (wherein M is H, a metal atom, $NR^7_4$, imidazolium optionally containing a substituent, pyridinium optionally containing a substituent, or phosphonium optionally containing a substituent, wherein $R^7$s are each H or an organic group and may be the same as or different from each other, and any two of $R^7$s may be bonded to each other to form a ring). The organic group for $R^7$ is preferably an alkyl group.

$R^7$ is preferably H or a $C_{1-10}$ organic group, more preferably H or a $C_{1-4}$ organic group, still more preferably H or a $C_{1-4}$ alkyl group.

Examples of the metal atom include alkali metal (Group 1) atoms and alkaline-earth metal (Group 2) atoms, and preferred are Na, K, and Li.

M is preferably —H, a metal atom, or —$NR^7_4$, more preferably —H, an alkali metal (Group 1) atom, an alkaline-earth metal (Group 2) atom, or —$NR^7_4$, still more preferably —H, —Na, —K, —Li, or —$NH_4$, further more preferably —Na, —K, or —$NH_4$, particularly preferably —Na or —$NH_4$, most preferably —$NH_4$.

$Y^3$ is preferably—COOM or —$SO_3M$, more preferably—COOM.

A suitable example of the monomer represented by the formula (5) is a fluoroallyl ether compound represented by the following formula (5a):

$$CX^h_2=CFCF_2—O—(CF(CF_3)CF_2O)_{n5}—CF(CF_3)—Y^3 \quad (5a)$$

(wherein $X^h$s are the same as each other and are each F or H; n5 is 0 or an integer of 1 to 10; and $Y^3$ is as defined above).

In the formula (5a), n5 is preferably 0 or an integer of 1 to 5, more preferably 0, 1, or 2, still more preferably 0 or 1 in order to provide PTFE particles having a small primary particle size. $Y^3$ is preferably—COOM in order to provide moderate water-solubility and interfacial activity. M is preferably H or $NH_4$ because they may less remain as an impurity and they may improve the heat resistance of the resulting resin composition and a molded article formed from the resin composition.

The monomer represented by the formula (5) is preferably a monomer (5b) represented by the following formula (5b):

$$CH_2=CF(—CF_2—O—Rf—Y^3) \quad (5b)$$

(wherein Rf and $Y^3$ are each as defined above)

A specific example of the monomer represented by the formula (5b) is a monomer represented by the following formula:

[Chem. 7]

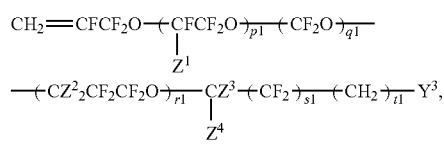

(wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; $Y^3$ is as defined above; and when both of $Z^3$ and $Z^4$ are H, p1+q1+r1+s1 is not 0). More specifically,

[Chem. 8]

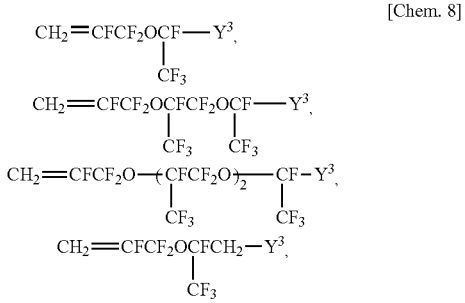

-continued $$CH_2=CFCF_2OCFCF_2OCFCH_2-Y^3,$$
$$\quad\quad\quad\quad\quad |\quad\quad\quad |$$
$$\quad\quad\quad\quad\quad CF_3\quad\quad CF_3$$

$$CH_2=CFCF_2O-(CFCF_2O)_2-CFCH_2-Y^3,$$
$$\quad\quad\quad\quad\quad\quad |\quad\quad\quad\quad\quad |$$
$$\quad\quad\quad\quad\quad\quad CF_3\quad\quad\quad\quad CF_3$$

$$CH_2=CFCF_2OCH_2CF_2-Y^3,$$

$$CH_2=CFCF_2O(CH_2CF_2CF_2O)CH_2CF_2-Y^3,$$

$$CH_2=CFCF_2OCH_2CF_2CH_2-Y^3,$$

$$CH_2=CFCF_2O(CH_2CF_2CF_2O)CH_2CF_2CH_2-Y^3,$$

$$CH_2=CFCF_2OCF_2CF_2-Y^3,$$

$$CH_2=CFCF_2O(CF_2CF_2CF_2O)CF_2CF_2-Y^3,$$

$$CH_2=CFCF_2OCF_2CF_2CH_2-Y^3,$$

$$CH_2=CFCF_2O(CF_2CF_2CF_2O)CF_2CF_2CH_2-Y^3,$$

$$CH_2=CFCF_2OCF_2C-Y^3,$$

$$CH_2=CFCF_2O(CF_2CF_2O)CF_2-Y^3,$$

$$CH_2=CFCF_2OCF_2CH_2-Y^3,$$

$$CH_2=CFCF_2O(CF_2CF_2O)CF_2CH_2-Y^3,$$

are preferably exemplified. Among these,

[Chem. 9]

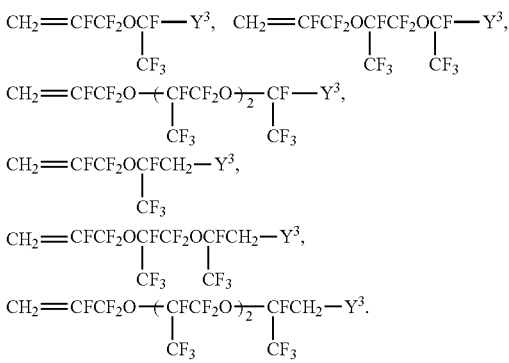

are preferred.

The monomer represented by the formula (5b) is preferably one represented by the formula (5b) wherein $Y^3$ is —COOM. Preferred among these is at least one selected from the group consisting of $CH_2=CFCF_2OCF(CF_3)COOM$ and $CH_2=CFCF_2OCF(CF_3)CF_2OCF(CF_3)COOM$ (wherein M is as defined above), and more preferred is $CH_2=CFCF_2OCF(CF_3)COOM$.

Preferably, the monomer represented by the formula (5) is a monomer (5c) represented by the following formula (5c):

$$CX^2{}_2=CFCF_2-O-(CF(CF_3)CF_2O)_{n5}-CF(CF_3)-Y^3 \quad (5c)$$

(wherein $X^2$s are the same as each other and are each F or H; n5 is 0 or an integer of 1 to 10; and $Y^3$ is as defined above).

In the formula (5c), n5 is preferably 0 or an integer of 1 to 5, more preferably 0, 1, or 2, still more preferably 0 or 1 in terms of the stability of the resulting aqueous dispersion. $Y^3$ is preferably —COOM[1] in order to achieve moderate water-solubility and to provide stability to the aqueous dispersion. M[1] is preferably H or NH[4] they may less remain as an impurity and they may improve the heat resistance of the resulting molded article.

Examples of the perfluorovinyl alkyl compound represented by the formula (5c) include $CH_2=CFCF_2OCF(CF_3)COOM^1$ and $CH_2=CFCF_2OCF(CF_3)CF_2OCF(CF_3)COOM^1$ (wherein $M^1$ is as defined above).

Another example of the monomer represented by the formula (5) is a monomer represented by the following formula (5d):

$$CF_2=CFCF_2-O-Rf-Y^3 \quad (5d)$$

(wherein Rf and $Y^3$ are each as defined above)

More specific examples are

[Chem. 10]

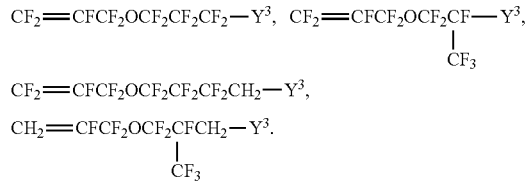

In the formula (6), X is —H or —F. Both Xs may be —F, or at least one X may be —H. For example, one of the Xs may be —F and the other may be —H, or both Xs may be —H.

In the formula (6), Y is —H, —F, an alkyl group, or a fluorine-containing alkyl group.

The alkyl group is a fluorine-free alkyl group, and the carbon number thereof is 1 or more. The carbon number of the alkyl group is preferably 6 or less, more preferably 4 or less, still more preferably 3 or less.

The fluorine-containing alkyl group is an alkyl group containing at least one fluorine atom, and the carbon number thereof is 1 or more. The carbon number of the fluorine-containing alkyl group is preferably 6 or less, more preferably 4 or less, still more preferably 3 or less.

Y is preferably —H, —F, or —$CF_3$, more preferably —F.

In the formula (6), at least one selected from the group consisting of X and Y preferably contains a fluorine atom. For example, X may be —H, and Y and Z may each be —F.

In the formula (6), Rf is a C1-C40 fluorine-containing alkylene group or a C2-C100 fluorine-containing alkylene group containing an ether bond.

The carbon number of the fluorine-containing alkylene group is preferably 2 or more. The carbon number is preferably 30 or less, more preferably 20 or less, still more preferably 10 or less. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. Preferably, the fluorine-containing alkylene group is a perfluoroalkylene group.

Preferably, the monomer represented by the formula (6) includes at least one selected from the group consisting of monomers represented by the following formulas (6a), (6b), (6c), and (6d):

$$CF_2=CF-O-(CF_2)_{n1}-Y^3 \quad (6a)$$

(wherein n1 is an integer of 1 to 10; $Y^3$ is —$SO_3M^1$ or —COOM[1]; M[1] is H, a metal atom, $NR^7{}_4$, imidazolium optionally containing a substituent, pyridinium optionally containing a substituent, or phosphonium optionally containing a substituent, wherein R$^7$s are each H or an organic group)

$$CF_2=CF-O-(CF_2C(CF_3)F)_{n2}-Y^3 \quad (6b)$$

(wherein n2 is an integer of 1 to 5, and Y$^3$ is as defined above)

$$CF_2=CF-O-(CFX^1)_{n3}-Y^3 \quad (6c)$$

(wherein X$^1$ is F or CF$_3$, n3 is an integer of 1 to 10, and Y$^3$ is as defined above)

$$CF_2=CF-O-(CF_2CFX^1O)_{n4}-CF_2CF_2-Y^3 \quad (6d)$$

(wherein n4 is an integer of 1 to 10, and Y$^3$ and X$^1$ are each as defined above).

In the formula (6a), n1 is preferably an integer of 5 or less, more preferably an integer of 2 or less. Y$^3$ is preferably—COOM$^1$ in order to achieve moderate water-solubility and to provide stability to the aqueous dispersion. M$^1$ is preferably H or NH$_4$ they may less remain as an impurity and they may improve the heat resistance of the resulting molded article.

An example of the perfluorovinyl alkyl compound represented by the formula (6a) is CF$_2$=CF—O—CF$_2$COOM$^1$ (wherein M$^1$ is as defined above).

In the formula (6b), n2 is preferably an integer of 3 or less in terms of the stability of the resulting aqueous dispersion. Y$^3$ is preferably—COOM in order to achieve moderate water-solubility and to provide stability to the aqueous dispersion. M$^1$ is preferably H or NH$_4$ they may less remain as an impurity and they may improve the heat resistance of the resulting molded article.

In the formula (6c), n3 is preferably an integer of 5 or less in terms of the water-solubility. Y$^3$ is preferably —COOM$^1$ in order to achieve moderate water-solubility and to provide stability to the aqueous dispersion. M$^1$ is preferably H or NH$_4$ for better dispersion stability.

In the formula (6d), X$^1$ is preferably —CF$_3$ in terms of the stability of the aqueous dispersion, n4 is preferably an integer of 5 or less in terms of the water-solubility, Y$^3$ is preferably—COOM$^1$ in order to achieve moderate water-solubility and to provide stability to the aqueous dispersion, and M$^1$ is preferably H or NH$_4$.

An example of the perfluorovinyl ether compound represented by the formula (6d) is CF$_2$=CFOCF$_2$CF(CF$_3$)OCF$_2$CF$_2$COOM$^1$ (wherein M$^1$ is H, NH$_4$, or an alkali metal).

In the formula (7), Rf is preferably a C1-C40 fluorine-containing alkylene group. In the formula (7), at least one selected from the group consisting of X and Y preferably contains a fluorine atom.

Preferably, the monomer represented by the formula (7) includes at least one selected from the group consisting of:
a monomer represented by the following formula (7a):

$$CF_2=CF-(CF_2)_{n1}-Y^3 \quad (7a)$$

(wherein n1 is an integer of 1 to 10, and Y$^3$ is as defined above); and
a monomer represented by the following formula (7b):

$$CF_2=CF-(CF_2C(CF_3)F)_{n2}-Y^3 \quad (7b)$$

(wherein n2 is an integer of 1 to 5, and Y$^3$ is as defined above).

Y$^3$ is preferably —SO$_3$M$^1$ or —COOM$^1$; and M$^1$ is preferably H, a metal atom, NR$^7_4$, imidazolium optionally containing a substituent, pyridinium optionally containing a substituent, or phosphonium optionally containing a substituent. R$^7$s are each H or an organic group.

In the formula (7a), n1 is preferably an integer of 5 or less, more preferably an integer of 2 or less. Y$^3$ is preferably—COOM in order to achieve moderate water-solubility and to provide stability to the aqueous dispersion. M$^1$ is preferably H or NH$_4$ they may less remain as an impurity and they may improve the heat resistance of the resulting molded article.

An example of the perfluorovinyl alkyl compound represented by the formula (7a) is CF$_2$=CFCF$_2$COOM$^1$ (wherein M$^1$ is as defined above).

In the formula (7b), n2 is preferably an integer of 3 or less in terms of the stability of the resulting aqueous dispersion. Y$^3$ is preferably—COOM$^1$ in order to achieve moderate water-solubility and to provide stability to the aqueous dispersion. M$^1$ is preferably H or NH$_4$ they may less remain as an impurity and they may improve the heat resistance of the resulting molded article.

The modifying monomer preferably includes the modifying monomer (A), and preferably contains at least one selected from the group consisting of compounds represented by the formula (5c), the formula (6a), the formula (6b), the formula (6c), and the formula (6d), more preferably a compound represented by the formula (5c).

When the modifying monomer includes the modifying monomer (A), the polymerized unit based on the modifying monomer (A) is preferably present in an amount within the range of 0.00001 to 1.0% by mass relative to the PTFE (A). The lower limit thereof is more preferably 0.0001% by mass, still more preferably 0.0005% by mass, further more preferably 0.001% by mass, still further more preferably 0.005% by mass, particularly preferably 0.009% by mass. The upper limit thereof is preferably 0.90% by mass, more preferably 0.50% by mass, still more preferably 0.40% by mass, further more preferably 0.30% by mass, still further more preferably 0.10% by mass, particularly preferably 0.08% by mass, more particularly preferably 0.05% by mass, still more particularly preferably 0.01% by mass.

The PTFE (A) may have a core-shell structure. The core-shell structure is a conventionally known structure and is a structure of primary particles in an aqueous dispersion obtainable by the method disclosed in U.S. Pat. No. 6,841,594 B.

Examples of the polytetrafluoroethylene having a core-shell structure include: a core-shell structure including a core formed from a TFE homopolymer and a shell formed from a modified PTFE; a core-shell structure including a core formed from a modified PTFE and a shell formed from a TFE homopolymer; and a core-shell structure including a core formed from a modified PTFE and a shell formed from a modified PTFE having a different monomer composition from the modified PTFE forming the core.

The PTFE having a core-shell structure is obtainable, for example, by polymerizing TFE and optionally a modifying monomer to form a core (a TFE homopolymer or a modified PTFE), and then polymerizing TFE and optionally a modifying monomer to form a shell-(a TFE homopolymer or a modified PTFE).

The shell means a portion with a certain thickness from a surface of a PTFE primary particle to the inside of the particle, and the core means a portion inside the shell.

The core-shell structure herein encompasses all of (1) a structure including a core and a shell having different monomer compositions, (2) a structure including a core and a shell having the same monomer composition but different number average molecular weights, and (3) a structure including a core and a shell having different monomer compositions and different number average molecular weights.

When the shell is formed from a modified PTFE, the shell preferably contains the modifying monomer in an amount of 0.00001 to 1.0% by mass, more preferably 0.0001% by mass or more, still more preferably 0.001% by mass or more, further more preferably 0.01% by mass or more. The amount thereof is more preferably 0.50% by mass or less, still more preferably 0.30% by mass or less.

When the core is formed from a modified PTFE, the core preferably contains the modifying monomer in an amount of 0.00001 to 1.0% by mass, more preferably 0.0001% by mass or more, still more preferably 0.001% by mass or more. The amount thereof is more preferably 0.50% by mass or less, still more preferably 0.30% by mass or less.

The PTFE (A) has a melt viscosity (MV) of preferably $1.0 \times 10$ Pa·s or more, more preferably $1.0 \times 10^2$ Pa·s or more, still more preferably $1.0 \times 10^3$ Pa·s or more.

The melt viscosity can be measured in conformity with ASTM D 1238. Specifically, a 2-g sample previously heated at a measurement temperature (380° C.) for five minutes is subjected to the measurement using a flow tester (available from Shimadzu Corporation) and a 2ϕ-8 L die at the above temperature at a load of 0.7 MPa.

The PTFE (A) preferably has a standard specific gravity (SSG) of 2.130 to 2.280, preferably 2.230 or less, more preferably 2.200 or less, still more preferably 2.190 or less, further more preferably 2.180 or less, still further more preferably 2.160 or less, particularly preferably 2.155 or less.

The standard specific gravity (SSG) herein can be determined by the water displacement method in accordance with ASTM D 4895-89.

The PTFE (A) preferably has a melting point of 324° C. to 360° C., more preferably 348° C. or lower, still more preferably 346° C. or lower, further more preferably 344° C. or lower, particularly preferably 342° C. or lower, more particularly preferably 340° C. or lower. The PTFE (A) preferably has heat of crystallization of 18.0 to 26.0 J/g. The melting point and heat of crystallization of the PTFE (A) herein mean temperatures corresponding to the maximum values on a heat-of-fusion curve drawn using a differential scanning calorimeter (DSC) at a temperature-increasing rate of 10° C./min.

The PTFE (A) preferably has fibrillatability. The fibrillatability means an ability to be readily fiberized to form fibrils. A fibrillatable PTFE provides continuous paste-extruded beads by paste extrusion molding, and the beads (unbaked beads) are stretchable. In contrast, when a non-fibrillatable PTFE is paste-extruded, continuous paste-extruded beads are not obtained, or even if they are obtained, the unbaked beads are hardly stretchable. The PTFE (A) preferably has non-melt processability in addition to fibrillatability. The non-melt processability means that the polymer cannot be processed in a molten state.

The PTFE (A) is preferably PTFE molding powder. The PTFE molding powder means powder obtainable by suspension polymerizing TFE. The PTFE molding powder may be any powder obtained by forming particles by polymerization and then granulating the particles by a known method.

The PTFE (A) is preferably in the form of particles and preferably has an average particle size of 1 to 2000 μm. The average particle size is more preferably 1000 μm or smaller, still more preferably 700 μm or smaller, further more preferably 100 μm or smaller. The average particle size is more preferably 5 μm or greater, still more preferably 10 μm or greater, further more preferably 15 μm or greater. Too large an average particle size may cause difficulty in molding or in mixing with the graphite (B), the talc (C), and the abrasion resistance-improving filler (D). Too small an average particle size may cause poor fluidity of the resin composition.

The average particle size of the PTFE particles is determined in accordance with JIS K6891 or is considered to be equal to the particle size corresponding to 50% of the cumulative volume in the particle size distribution in measurement using a laser diffraction particle size distribution analyzer at a dispersion pressure of 3.0 bar without cascade impaction. The laser diffraction particle size distribution analyzer may be, for example, HELOS & RODOS available from JEOL Ltd.

The PTFE (A) is preferably molding powder having an average particle size of 1 to 2000 μm, more preferably molding powder having an average particle size of 5 to 1000 μm, still more preferably molding powder having an average particle size of 5 to 700 μm, further more preferably molding powder having an average particle size of 5 to 100 μm, still further more preferably molding powder having an average particle size of 10 to 100 μm, particularly preferably molding powder having an average particle size of 15 to 100 μm.

The resin composition of the disclosure contains graphite (B). The presence of the graphite (B) allows the resulting molded article to have excellent low-torque properties.

The graphite (B) preferably has a crystallite size in the c-axis direction of 200 Å or greater, more preferably 250 Å or greater, still more preferably 300 Å or greater, further more preferably 350 Å or greater.

The crystallite size in the c-axis direction is determined by the Gakushin method including measuring the reflection from the (002) plane appearing in the X-ray diffraction pattern using an X-ray diffractometer.

Specifically, the crystallite size in the c-axis direction is determined by the Gakushin method as follows. X-ray diffraction analysis is performed with an X-ray diffractometer (Rigaku, Ultima III) by packing the measurement substance flat in a recess of a quartz sample holder, setting the X-ray source to Cu-Kα rays and the output to 40 kV and 40 mA, and measuring the reflection from the (002) plane appearing in the X-ray diffraction. Then, the crystallite size is determined.

The graphite (B) may be natural graphite such as vein graphite (e.g., lump graphite or flake graphite), amorphous graphite, or expandable graphite, or synthetic graphite such as pyrolyzed graphite. Preferred among these is natural graphite, and more preferred is flake graphite.

The graphite (B) may be anisotropic graphite or isotropic graphite. Preferred is anisotropic graphite.

The graphite (B) preferably has a Mohs hardness of 2 or less. The Mohs hardness can be measured with a Mohs scale.

Preferably, the graphite (B) is anisotropic graphite and has a Mohs hardness of 2 or less.

Preferably, the graphite (B) is in the form of flakes and has a thickness of 1 μm or smaller, more preferably 0.5 μm or smaller, still more preferably 0.1 μm or smaller.

The thickness can be measured by SEM observation, for example.

The graphite (B) preferably has an average particle size of 5 to 50 μm, preferably 8 to 30 μm, still more preferably 10 to 25 μm. The average particle size can be determined by laser diffractometry.

The resin composition of the disclosure contains talc (C). The presence of the talc (C) allows the resulting molded article to have excellent low-torque properties.

In terms of the chemical composition, the talc (C) is hydrated magnesium silicate, is typically represented by the formula: $4SiO_2 \cdot 3MgO \cdot 2H_2O$, and is typically in the form of flaky particles having a layered structure.

In order to have low-torque properties and excellent durability, the talc (C) preferably contains an $Al_2O_3$ component and an $Fe_2O_3$ component, more preferably contains the $Al_2O_3$ component in an amount of 0.6 to 18% by mass and the $Fe_2O_3$ component in an amount of 0.6 to 5.0% by mass, and still more preferably contains the $Al_2O_3$ component in an amount of 0.7 to 16% by mass and the $Fe_2O_3$ component in an amount of 0.65 to 4.0% by mass.

The amounts of the $SiO_2$ component, the MgO component, the $Al_2O_3$ component, and the $Fe_2O_3$ component are values determined by the test method in accordance with JIS M 8851.

The talc (C) preferably has an average particle size of 5 to 40 μm. The average particle size is more preferably 30 μm or smaller, still more preferably 25 μm or smaller, while more preferably 8 μm or greater, still more preferably 12 μm or greater.

The average particle size can be determined by laser diffractometry.

The resin composition of the disclosure contains an abrasion resistance-improving filler (D). The presence of the abrasion resistance-improving filler (D) allows the resulting molded article to have excellent durability.

Examples of the abrasion resistance-improving filler (D) include coke, carbon fibers, silicon dioxide, and glass fibers. In terms of the dispersibility with the resin, preferred among these is at least one selected from the group consisting of coke, carbon fibers, silicon dioxide, and glass fibers, more preferred is at least one selected from the group consisting of coke, carbon fibers, and glass fibers, and still more preferred is at least one selected from the group consisting of coke and carbon fibers.

The carbon fibers may be any of PAN-based carbon fibers, pitch-based carbon fibers, and cellulose-based carbon fibers. In addition, the carbon fibers may be isotropic carbon fibers or anisotropic carbon fibers.

The coke preferably has a crystallite size in the c-axis direction of 1 to 150 Å, more preferably 10 to 80 Å, still more preferably 15 to 45 Å.

The crystallite size in the c-axis direction is determined by the Gakushin method including measuring the reflection from the (002) plane appearing in the X-ray diffraction pattern using an X-ray diffractometer.

Specifically, the crystallite size in the c-axis direction is determined by the Gakushin method as follows. X-ray diffraction analysis is performed with an X-ray diffractometer (Rigaku, Smartlab) by packing the measurement substance flat in a recess of a quartz sample holder, setting the X-ray source to Cu-Kα rays and the output to 40 kV and 40 mA, and measuring the reflection from the (002) plane appearing in the X-ray diffraction. Then, the crystallite size is determined.

The carbon fibers preferably have a crystallite size in the c-axis direction of 1 to 150 Å, more preferably 5 to 80 Å, still more preferably 10 to 60 Å.

The crystallite size in the c-axis direction is determined by the Gakushin method including measuring the reflection from the (002) plane appearing in the X-ray diffraction pattern using an X-ray diffractometer.

Specifically, the crystallite size in the c-axis direction is determined by the Gakushin method as follows. X-ray diffraction analysis is performed with an X-ray diffractometer (Rigaku, Smartlab) by packing the measurement substance flat in a recess of a quartz sample holder, setting the X-ray source to Cu-Kα rays and the output to 40 kV and 40 mA, and measuring the reflection from the (002) plane appearing in the X-ray diffraction. Then, the crystallite size is determined.

The carbon fibers preferably have an average fiber length of 30 μm or greater and 300 μm or smaller, more preferably 50 μm or greater and 200 μm or smaller, still more preferably 60 μm or greater and 150 μm or smaller. The average fiber diameter thereof is preferably 1 μm or greater and 20 μm or smaller, more preferably 5 μm or greater and 18 μm or smaller, still more preferably 10 μm or greater and 15 μm or smaller.

The average fiber length and the average fiber diameter can be determined by observation with a video microscope, a microscope, or the like.

The silicon dioxide preferably has an average particle size of 10 μm or greater and 50 μm or smaller.

The average particle size can be measured by the light scattering method, for example.

Glass fibers preferably have an average fiber length of 20 μm or greater and 150 μm or smaller.

The average fiber diameter is preferably 10 μm or greater and 20 μm or smaller.

The average fiber length and the average fiber diameter can be determined by observation with a microscope, for example.

The resin composition of the disclosure preferably contains the PTFE (A) in an amount of 55 to 90 parts by mass relative to 100 parts by mass of the total of the polytetrafluoroethylene (A), the graphite (B), the talc (C), and the abrasion resistance-improving filler (D). The amount of the PTFE (A) is more preferably 60 parts by mass or more, still more preferably 65 parts by mass or more, while more preferably 85 parts by mass or less, still more preferably 80 parts by mass or less.

The resin composition of the disclosure preferably contains the graphite (B) in an amount of 1 to 30 parts by mass relative to 100 parts by mass of the total of the polytetrafluoroethylene (A), the graphite (B), the talc (C), and the abrasion resistance-improving filler (D).

In order to achieve better low-torque properties, the amount of the graphite (B) is more preferably 5 parts by mass or more, still more preferably 10 parts by mass or more, while more preferably 15 parts by mass or less.

The resin composition of the disclosure preferably contains the talc (C) in an amount of 1 to 30 parts by mass relative to 100 parts by mass of the total of the polytetrafluoroethylene (A), the graphite (B), the talc (C), and the abrasion resistance-improving filler (D).

In order to achieve better low-torque properties, the amount of the talc (C) is more preferably 5 parts by mass or more, still more preferably 20 parts by mass or more.

The resin composition of the disclosure preferably contains the abrasion resistance-improving filler (D) in an amount of 3 to 9 parts by mass relative to 100 parts by mass of the total of the polytetrafluoroethylene (A), the graphite (B), the talc (C), and the abrasion resistance-improving filler (D).

The amount of the abrasion resistance-improving filler (D) is more preferably 4 parts by mass or more, while more preferably 8 parts by mass or less.

The resin composition of the disclosure preferably contains the graphite (B) and the talc (C) in a total amount of 17 to 40 parts by mass, more preferably 18 to 40 parts by mass, still more preferably 25 to 40 parts by mass, particularly preferably 30 to 40 parts by mass relative to 100 parts by mass of the total of the polytetrafluoroethylene (A), the graphite (B), the talc (C), and the abrasion resistance-improving filler (D).

The resin composition of the disclosure preferably contains 55 to 90 parts by mass of the polytetrafluoroethylene (A), 1 to 30 parts by mass of the graphite (B), 1 to 30 parts by mass of the talc (C), 17 to 40 parts by mass of the total of the graphite (B) and the talc (C), and 3 to 9 parts by mass of the abrasion resistance-improving filler (D), more preferably contains 60 to 85 parts by mass of the polytetrafluoroethylene (A), 5 to 15 parts by mass of the graphite (B), 5 to 30 parts by mass of the talc (C), 18 to 40 parts by mass of the total of the graphite (B) and the talc (C), and 4 to 8 parts by mass of the abrasion resistance-improving filler (D), still more preferably contains 65 to 80 parts by mass of the polytetrafluoroethylene (A), 5 to 15 parts by mass of the graphite (B), 20 to 30 parts by mass of the talc (C), 25 to 40 parts by mass of the total of the graphite (B) and the talc (C), and 4 to 8 parts by mass of the abrasion resistance-improving filler (D), particularly preferably contains 65 to 80 parts by mass of the polytetrafluoroethylene (A), 10 to 15 parts by mass of the graphite (B), 20 to 30 parts by mass of the talc (C), 30 to 40 parts by mass of the total of the graphite (B) and the talc (C), and 4 to 8 parts by mass of the abrasion resistance-improving filler (D) relative to 100 parts by mass of the total of the polytetrafluoroethylene (A), the graphite (B), the talc (C), and the abrasion resistance-improving filler (D).

Preferably, in the resin composition of the disclosure, the PTFE (A) is molding powder of a modified PTFE, the graphite (B) is natural graphite having a crystallite size in the c-axis direction of 300 Å or greater, the talc (C) contains 0.6 to 18% by mass of the $Al_2O_3$ component and 0.6 to 5.0% by mass of the $Fe_2O_3$ component, and the abrasion resistance-improving filler (D) includes at least one selected from the group consisting of coke, carbon fibers, and glass fibers. More preferably, in the resin composition of the disclosure, the PTFE (A) is molding powder of a modified PTFE containing a modifying monomer unit including at least one selected from the group consisting of HFP, CTFE, VDF, PPVE, PFBE, and ethylene, the graphite (B) is natural graphite having a crystallite size in the c-axis direction of 350 Å or greater, the talc (C) contains 0.7 to 16% by mass of the $Al_2O_3$ component and 0.65 to 4.0% by mass of the $Fe_2O_3$ component, and the abrasion resistance-improving filler (D) includes at least one selected from the group consisting of coke and carbon fibers.

The resin composition of the disclosure may consist only of the PTFE (A), the graphite (B), the talc (C), and the abrasion resistance-improving filler (D), or may further contain different component(s) according to need. The resin composition of the disclosure may contain the PTFE (A), the graphite (B), the talc (C), and the abrasion resistance-improving filler (D) in a total amount of 90% by mass or more, 95% by mass or more, 99% by mass or more, or substantially 100% by mass.

The different component(s) may be any combination of various additives such as metals, inorganic or organic reinforcing fillers, inorganic or organic compatibilizers, lubricants (carbon fluoride, carbon graphite, and molybdenum disulfide), and stabilizers.

The resin composition of the disclosure can be produced by a known method. For example, the PTFE (A), the graphite (B), the talc (C), the abrasion resistance-improving filler (D), and optionally the different component(s) selected according to need are mixed in a mixer such as a V blender, a tumbler, a Henschel mixer, a ball mixer, or a Lödige mixer.

The resin composition of the disclosure allows the resulting molded article to have excellent low-torque properties and excellent durability and thus is suitably used as a sliding material. Examples of products including such a sliding material include various gears, bearings for sliding friction systems and rolling friction systems, brakes, clutch parts, piston rings, and various sealing materials. Suitable applications include seal rings for various hydraulic instruments such as automatic transmissions and continuously variable transmissions of automobiles. The resin composition can also be used as seals (tip seals, piston rings) for compressors containing gas such as carbon dioxide, natural gas, freon substitute, air, or helium gas; high water pressure seals for tall construction; seal rings for power steering of vehicles such as trucks, buses, and automobiles; and seal bearings of construction machines such as loading shovels, forklifts, bulldozers, and nail guns.

For example, a desired molded article (e.g., seal ring) can be obtained by mixing the PTFE (A), the graphite (B), the talc (C), the abrasion resistance-improving filler (D), and optionally different component(s) selected according to need in the mixer to provide a resin composition, molding the resin composition by a molding method such as compression molding, extrusion molding, or injection molding, baking the resulting molded article at 350° C. to 380° C. for 0.5 to 10 hours, and then processing the baked article by cutting, for example.

The disclosure provides a molded article obtained by compression molding, extrusion molding, or injection molding the resin composition. The molded article of the disclosure preferably has a dynamic coefficient of friction of 0.2 or less, more preferably 0.15 or less. The lower limit value of the dynamic coefficient of friction is not limited.

The dynamic coefficient of friction can be determined by the method shown in the examples.

Examples of the applications of the molded article of the disclosure include, but are not limited to, solid packings for a grounding seal of low-speed stirrers, packings such as braided packings; valves and compressors of aircrafts, seal rings for fluid pressure devices such as power steerings and automatic transmissions of automobiles; members of valves, such as ball valves, butterfly valves, diaphragm valves, check valves, and gate valves, for flow control of highly corrosive chemicals and gases; bearing materials such as bearing materials for front top rollers for roving frames in the textile industry, bearing materials for chemical devices, and bearing materials for sluice gates; sliding pads for adjustable terminals of tanks and bridges and for shoes of sliding parts of heavy loads such as railway bogies; automotive sliding parts such as ball joints of automotive front wheel bearings, rod end bearings, window stabilizers, wiper bearings, door hinges, and shock absorbers.

The molded article of the disclosure is preferably a seal ring. The seal ring is typically used for sealing fluid or semifluid, and main examples of its cross-sectional shape include, but are not limited to, a circle, a polygon, a U shape, and a V shape. The fluid or semifluid to be sealed with the seal ring may be gas or liquid. Examples of the liquid include, but are not limited to, hydrocarbons used for working hydraulic oil of hydraulic equipment.

The molded article of the disclosure has excellent low-torque properties and excellent durability, and thus is particularly suitably used for a seal ring of an automatic transmission. The disclosure also provides an automatic transmission including the molded article as a seal ring.

The disclosure also provides a seal ring having a torque coefficient of 0.42 N·m/MPa or less and a durability of 150 hours or more.

The seal ring of the disclosure has a torque coefficient of 0.42 N·m/MPa or less, more preferably 0.40 N·m/MPa or less, still more preferably 0.35 N·m/MPa or less, particularly preferably 0.30 N·m/MPa or less. A lower torque coefficient is better, and the lower limit thereof is not limited.

The torque coefficient is a value measured by the method shown in the examples using an AT seal ring evaluation device.

The seal ring of the disclosure has a durability of 150 hours or more, more preferably 200 hours or more, still more preferably 300 hours or more, particularly preferably 1000 hours or more. A higher durability is better, and the upper limit thereof is not limited.

The durability is a value measured by the method shown in the examples using an AT seal ring evaluation device.

The seal ring of the disclosure has a dynamic coefficient of friction of 0.20 or less, more preferably 0.15 or less, still more preferably 0.10 or less, particularly preferably 0.05 or less. A lower dynamic coefficient of friction is better, and the lower limit thereof is not limited.

The dynamic coefficient of friction is a value measured by the method shown in the examples.

The seal ring of the disclosure may have any conventionally known shape. The seal ring may have an outer diameter (nominal diameter) of 20 to 200 mm and a thickness (radial width) of 1 to 10 mm, for example. The seal ring may have a width (axial width) of 1 to 10 mm.

The cross section in the circumferential direction of the seal ring may be a circle, a polygon, a U shape, or a V shape, preferably a circle or a polygon, more preferably a polygon.

The seal ring of the disclosure can be obtained by compression molding the resin composition of the disclosure, for example. For example, the seal ring can be produced under conventionally known compression molding conditions except for using the resin composition of the disclosure.

The seal ring of the disclosure may have a composition similar to that of the resin composition of the disclosure. For example, the seal ring of the disclosure may contain the PTFE (A), the graphite (B), the talc (C), and the abrasion resistance-improving filler (D), and may contain 50 to 90 parts by mass of the polytetrafluoroethylene (A), 1 to 35 parts by mass of the graphite (B), 1 to 35 parts by mass of the talc (C), 16 to 40 parts by mass of the total of the graphite (B) and the talc (C), and 2 to 10 parts by mass of the abrasion resistance-improving filler (D) relative to 100 parts by mass of the total of the polytetrafluoroethylene (A), the graphite (B), the talc (C), and the abrasion resistance-improving filler (D). The preferred embodiments shown in the resin composition of the disclosure may be appropriately employed for the components (A) to (D) and other components of the seal ring.

The disclosure relates to a resin composition including: polytetrafluoroethylene (A); graphite (B); talc (C); and an abrasion resistance-improving filler (D), the resin composition containing 50 to 90 parts by mass of the polytetrafluoroethylene (A), 1 to 35 parts by mass of the graphite (B), 1 to 35 parts by mass of the talc (C), 16 to 40 parts by mass of a total of the graphite (B) and the talc (C), and 2 to 10 parts by mass of the abrasion resistance-improving filler (D) relative to 100 parts by mass of a total of the polytetrafluoroethylene (A), the graphite (B), the talc (C), and the abrasion resistance-improving filler (D).

Preferably, the polytetrafluoroethylene (A) is molding powder having an average particle size of 5 to 100 μm.

Preferably, the polytetrafluoroethylene (A) is a modified polytetrafluoroethylene.

Preferably, the graphite (B) has a crystallite size in a c-axis direction of 200 Å or greater.

Preferably, the graphite (B) is anisotropic graphite having a Mohs hardness of 2 or less.

Preferably, the graphite (B) is flake graphite having a thickness of 1 μm or smaller.

Preferably, the talc (C) contains 0.6 to 18% by mass of an $Al_2O_3$ component and 0.6 to 5.0% by mass of an $Fe_2O_3$ component.

Preferably, the abrasion resistance-improving filler (D) includes at least one selected from the group consisting of coke, carbon fibers, silicon dioxide, and glass fibers.

Preferably, the resin composition is intended for a sliding material.

The disclosure also relates to a molded article obtainable by compression molding, extrusion molding, or injection molding the resin composition.

Preferably, the molded article has a dynamic coefficient of friction of 0.2 or less.

Preferably, the molded article is intended for a seal ring.

The disclosure also relates to an automatic transmission including the molded article.

EXAMPLES

The resin composition of the disclosure is described with reference to examples, but the examples are not intended to limit the resin composition of the disclosure.

The raw materials and compounds used in the examples are described.
(1) Polytetrafluoroethylene (PTFE) (A)
[PTFE]
A PTFE modified with 0.1% by mass of perfluoro(propyl vinyl ether), average particle size: 20 μm, standard specific gravity (SSG): 2.15, melting point: 340° C., heat of crystallization: 25 J/g.
(2) Graphite (B)
[Natural Graphite]
Trade name: CPB (available from Nippon Graphite Industries, Co., Ltd.), crystallite size in the c-axis direction: 390 Å, Mohs hardness: 1.5, average particle size: 23 μm, form: flakes, thickness: 0.1 μm
(3) Talc (C)
[Talc A]
Trade name: W85P (available from Matsumura Sangyo Co., Ltd.), $Al_2O_3$ component: 2.29% by mass, $Fe_2O_3$ component: 0.84% by mass, average particle size: 16 μm
[Talc B]
Trade name: PP (available from Matsumura Sangyo Co., Ltd.), $Al_2O_3$ component: 0.50% by mass, $Fe_2O_3$ component: 0.54% by mass, average particle size: 15 μm
(4) Abrasion Resistance-Improving Filler (D)
[Coke]
Trade name: AT No2CR (available from Oriental Industry Co., Ltd.), crystallite size in the c-axis direction: 24 Å, average particle size: 23 μm
[Carbon Fibers]
Trade name: M-20065 (available from Kureha Corporation), crystallite size in the c-axis direction: 15 Å, average fiber diameter: 14.5 μm, average fiber length: 69 μm
Crystallite Size in c-Axis Direction
The crystallite size in the c-axis direction was determined by the Gakushin method as follows. X-ray diffraction analysis was performed with an X-ray diffractometer (Rigaku, Smartlab) by packing the measurement substance flat in a recess of a quartz sample holder, setting the X-ray source to Cu-Kα rays and the output to 40 kV and 40 mA, and measuring the reflection from the (002) plane appearing in the X-ray diffraction. Then, the crystallite size was determined.

Average Particle Size (1) Average Particle Size of PTFE (A)

The average particle size of the PTFE was determined by measurement using a laser diffraction particle size distribution analyzer (HELOS & RODOS, available from JEOL Ltd.) at a dispersion pressure of 3.0 bar without cascade impaction and taking the particle size corresponding to 50% of the cumulative volume in the particle size distribution as the average particle size.

(2) Average Particle Size of Graphite (B)

The average particle size of the graphite (B) was determined by laser diffractometry.

(3) Average Particle Size of Talc (C)

The average particle size of the talc (C) was determined by laser diffractometry.

(4) Average Particle Size of Coke and Carbon Fibers

The average particle size of coke was determined by laser diffractometry. The average particle size of carbon fibers was determined by measuring the particle sizes of particles with a video microscope, performing image processing, and then determining the average fiber diameter and the average fiber length.

Particle Thickness

The particle thickness was determined by SEM observation.

Standard Specific Gravity (SSG)

The standard specific gravity was determined by the water displacement method in accordance with ASTM D 4895-89.

Melting Point

The melting point is a value determined as a temperature corresponding to the maximum value on a heat-of-fusion curve drawn using a differential scanning calorimeter (DSC) at a temperature-increasing rate of 10° C./min.

Methods for measuring the properties evaluated in the experiment examples are described.

Torque Coefficient

Test Device: AT Seal Ring Evaluation Tester

As shown FIG. 1, the device has the following mechanism. That is, two seal rings 21 are incorporated in the device to provide an oil chamber 13. When the oil chamber 13 is pressurized, a cylinder 12 in contact with the outer peripheries of the seal rings 21 is rotated. The rotational torque during the rotation was measured, and the ratio of the change in rotational torque to the change in oil pressure was taken as a torque coefficient.

Measurement Conditions:
Oil pressure: increased by 0.1 MPa every five minutes from 0.1 MPa to 1 MPa
Oil temperature: room temperature
Oil type: automatic transmission fluid (TOYOTA AUTO FLUID WS)
Cycle: rotation speed of 2000 rpm
Cylinder material: S45C
Member for fitting seal rings: S45C Durability Test device: AT seal ring evaluation tester Using the same device as for torque coefficient determination, the oil chamber 13 was pressurized at an oil pressure of 2 MPa whereby the cylinder 12 was rotated at 2000 rpm, and the time period was measured until the seal rings 21 failed to keep the oil pressure of the oil chamber 13.

Measurement Conditions:
Oil pressure: 2 MPa
Oil temperature: room temperature
Oil type: automatic transmission fluid (TOYOTA AUTO FLUID WS)
Rotation speed: 2000 rpm
Cylinder material: S45C
Member for fitting seal rings: S45C Dynamic Coefficient of Friction Test device: 553-F—S ABRATION TESTER (available from Yasuda Seiki Seisakusho, Ltd.)

Using the test device, the friction was measured between a 100 mm×50 mm×2 mmt molded sheet and a steel (S45C) pin having a tip radius of 5 mm with the steel pin pushed against the sheet at a force of 50 gf in a linear motion at a speed of 10 mm/s.

Example 1

Figure 2:
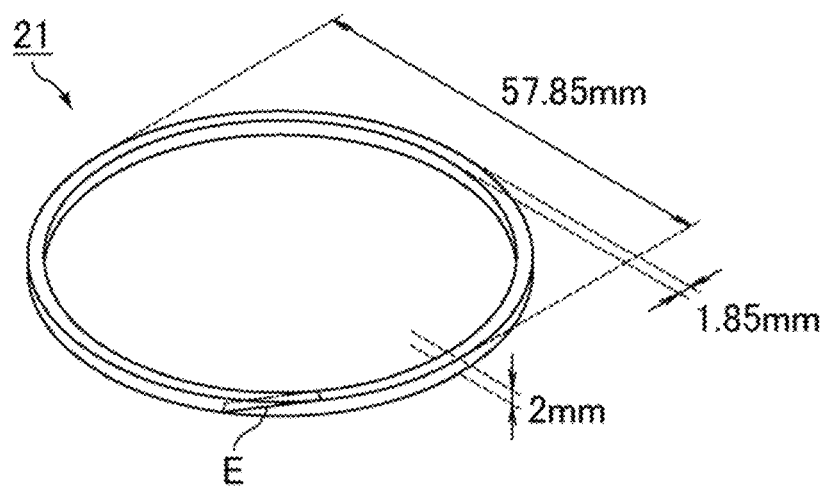
FIG. 2 is a schematic view of a seal ring obtained in each of the examples and comparative examples.

Using a Henschel mixer, 70 parts by mass of polytetrafluoroethylene resin powder (above PTFE) obtained by suspension polymerization, 20 parts by mass of natural graphite, 5 parts by mass of talc A, and 5 parts by mass of coke were mixed to provide a resin composition. The resulting resin composition was molded at a molding pressure of 900 kgf for five minutes into a piece with a size of φ (65 to 45)×40 mm, followed by cutting, to provide the seal rings 21 shown in FIG. 2.

Examples 2 to 5 and Comparative Examples 1 to 8 Resin compositions were each obtained as in Example 1, except that the types of the talc (C) and the abrasion resistance-improving filler (D) and the amounts of the components were changed according to Table 1. Each resulting resin composition was molded at a molding pressure of 900 kgf for five minutes into a piece with a size of φ (65 to 45)×40 mm, followed by cutting, to provide the seal rings 21 shown in FIG. 2.

TABLE 1

|  | Example 1 | Example 2 | Example 3 | Example 4 | Example 5 | Comparative Example 1 | Comparative Example 2 |
|---|---|---|---|---|---|---|---|
| PTFE (A) | PTFE | PTFE | PTFE | PTFE | PTFE | PTFE | PTFE |
| Amount (parts by mass) | 70 | 70 | 70 | 74 | 65 | 70 | 70 |
| Graphite (B) | Natural graphite | Natural graphite | Natural graphite | Natural graphite | Natural graphite | Natural graphite | |
| Amount (parts by mass) | 20 | 5 | 5 | 20 | 20 | 30 | |
| Talc (C) | Talc A | Talc A | Talc A | Talc A | Talc A |  | Talc A |
| Amount (parts by mass) | 5 | 20 | 20 | 1 | 10 |  | 30 |
| Abrasion resistance-improving filler (D) | Coke | Carbon fibers | Coke | Coke | Coke |  |  |

TABLE 1-continued

| | | | | | | | |
|---|---|---|---|---|---|---|---|
| Amount (parts by mass) | 5 | 5 | 5 | 5 | 5 | | |
| Torque coefficient (best) | 0.30 | 0.33 | 0.25 | 0.36 | 0.29 | 0.19 | 0.16 |
| Durability (hours) | 150 or more | 150 or more | 150 or more | 150 or more | 150 or more | 10 | 113 |
| Dynamic coefficient of friction | 0.11 | 0.11 | 0.07 | 0.06 | 0.09 | 0.10 | 0.10 |

| | Comparative Example 3 | Comparative Example 4 | Comparative Example 5 | Comparative Example 6 | Comparative Example 7 | Comparative Example 8 |
|---|---|---|---|---|---|---|
| PTFE (A) | PTFE | PTFE | PTFE | PTFE | PTFE | PTFE |
| Amount (parts by mass) | 70 | 70 | 70 | 70 | 74 | 80 |
| Graphite (B) | | | Natural graphite | | Natural graphite | Natural graphite |
| Amount (parts by mass) | | | 25 | | 20 | 10 |
| Talc (C) | Talc B | | | Talc A | Talc A | Talc A |
| Amount (parts by mass) | 30 | | | 25 | 5 | 5 |
| Abrasion resistance-improving filler (D) | | Coke | Coke | Coke | Coke | Coke |
| Amount (parts by mass) | | 30 | 5 | 5 | 1 | 5 |
| Torque coefficient (best) | 0.24 | 0.86 | 0.43 | 0.46 | 0.41 | 0.52 |
| Durability (hours) | 3 | — | 150 or more | 150 or more | 74 | 150 or more |
| Dynamic coefficient of friction | 0.06 | 0.09 | 0.07 | 0.08 | 0.06 | 0.07 |

REFERENCE SIGNS LIST

11: AT seal ring evaluation tester
12: cylinder
13: oil chamber
21: seal ring
A: oil OUT
B: oil IN.
C: oil leak
D: cylinder rotation direction
E: bias cut (cut angle: 10 degrees)

What is claimed is:

1. A resin composition comprising:
polytetrafluoroethylene (A);
graphite (B);
talc (C); and
an abrasion resistance-improving filler (D),
the resin composition containing 50 to 80 parts by mass of the polytetrafluoroethylene (A), 1 to 35 parts by mass of the graphite (B), 1 to 80 parts by mass of the talc (C), 16 to 40 parts by mass of a total of the graphite (B) and the talc (C), and 2 to 10 parts by mass of the abrasion resistance-improving filler (D) relative to 100 parts by mass of a total of the polytetrafluoroethylene (A), the graphite (B), the talc (C), and the abrasion resistance-improving filler (D).

2. The resin composition according to claim 1, wherein the polytetrafluoroethylene (A) is molding powder having an average particle size of 5 to 100 μm.

3. The resin composition according to claim 1, wherein the polytetrafluoroethylene (A) is a modified polytetrafluoroethylene.

4. The resin composition according to claim 1, wherein the graphite (B) has a crystallite size in a c-axis direction of 200 Å or greater.

5. The resin composition according to claim 1, wherein the graphite (B) is anisotropic graphite having a Mohs hardness of 2 or less.

6. The resin composition according to claim 1, wherein the graphite (B) is flake graphite having a thickness of 1 μm or smaller.

7. The resin composition according to claim 1, wherein the talc (C) contains 0.6 to 18% by mass of an $Al_2O_3$ component and 0.6 to 5.0% by mass of an $Fe_2O_3$ component.

8. The resin composition according to claim 1, wherein the abrasion resistance-improving filler (D) includes at least one selected from the group consisting of coke, carbon fibers, silicon dioxide, and glass fibers.

9. The resin composition according to claim 1, intended for a sliding material.

10. A molded article obtained by compression molding, extrusion molding, or injection molding the resin composition according to claim 1.

11. The molded article according to claim 10, wherein the molded article has a dynamic coefficient of friction of 0.2 or less.

12. The molded article according to claim 10, intended for a seal ring.

13. An automatic transmission comprising the molded article according to claim 12.

* * * * *